US008824179B2

(12) United States Patent   (10) Patent No.: US 8,824,179 B2
Limpaecher   (45) Date of Patent: Sep. 2, 2014

(54) SOFT-SWITCHING HIGH VOLTAGE POWER CONVERTER

(71) Applicant: Rudolf Limpaecher, Sarasota, FL (US)

(72) Inventor: Rudolf Limpaecher, Sarasota, FL (US)

( * ) Notice: Subject to any disclaimer, the term of this patent is extended or adjusted under 35 U.S.C. 154(b) by 0 days.

(21) Appl. No.: 13/858,416

(22) Filed: Apr. 8, 2013

(65) Prior Publication Data

US 2014/0049990 A1   Feb. 20, 2014

Related U.S. Application Data

(60) Provisional application No. 61/742,551, filed on Aug. 14, 2012.

(51) Int. Cl.
*H02M 3/335* (2006.01)
*H02M 3/24* (2006.01)

(52) U.S. Cl.
CPC ..................................... *H02M 3/24* (2013.01)
USPC ............................................ 363/71; 363/68

(58) Field of Classification Search
CPC ..................... H02M 1/083; H02M 2003/0058
USPC ................................. 363/65, 68, 71; 323/361
See application file for complete search history.

(56) References Cited

U.S. PATENT DOCUMENTS

| | | |
|---|---|---|
| 5,905,371 A | 5/1999 | Limpaecher |
| 5,986,907 A | 11/1999 | Limpaecher |
| 6,005,788 A | 12/1999 | Lipo et al. |
| 6,118,678 A | 9/2000 | Limpaecher et al. |
| 7,558,087 B2 | 7/2009 | Meysenc et al. |
| 8,000,118 B1 | 8/2011 | Limpaecher et al. |
| 2002/0024824 A1* | 2/2002 | Reinold .......................... 363/17 |
| 2005/0254272 A1* | 11/2005 | Vinciarelli ..................... 363/65 |
| 2011/0007527 A1* | 1/2011 | Liu et al. .................... 363/21.02 |
| 2012/0300504 A1* | 11/2012 | Ye et al. ..................... 363/21.02 |
| 2012/0320638 A1* | 12/2012 | Boysen et al. .............. 363/21.02 |

OTHER PUBLICATIONS

Leon M. Tolbert, et al., "Multilevel Converters as a Utility Interface for Renewable Energy Systems", Proceeding of *Power Engineering Society Summer Meeting, 2000. IEEE,* Aug. 6, 2002, pp. 1271-1274 vol. 2.

* cited by examiner

*Primary Examiner* — Harry Behm
(74) *Attorney, Agent, or Firm* — Occhiuti & Rohlicek LLP

(57) ABSTRACT

In a general aspect, a charge transfer includes a transformer including a plurality of primary windings and a plurality of galvanically isolated secondary windings, a first plurality of resonant converters having input terminals connected in series to an input power terminal and having output terminals connected to different primary windings of the plurality of primary windings, a second plurality of resonant converters having input terminals connected to different secondary windings of the plurality of secondary windings and having output terminals connected to a galvanically isolated power terminal, and a control system for controlling a transfer of electric charge between the input power terminal and the galvanically isolated output power terminal including controlling a first plurality of switches of the first plurality of resonant converters and a second plurality of switches of the second plurality of resonant converters in a zero current soft switching mode.

19 Claims, 13 Drawing Sheets

ND VOLTAGE POWER CONVERTER

SOFT-SWITCHING HIGH VOLTAGE POWER CONVERTER

CROSS-REFERENCE TO RELATED APPLICATIONS

This application claims the benefit of U.S. Provisional Application No. 61/742,551 filed Aug. 14, 2012.

BACKGROUND

The present invention relates to soft switching high voltage and resonant power converters. It is well known in the art that DC transmission is more efficient than AC transmission. Additionally, the construction of AC transmission lines is more costly per mile than an over-land High Voltage Direct Current (HVDC) lines. Conventionally, most power is generated at approximately 11 kV AC and is consumed by end users as AC power. In order to transmit generated AC power as HVDC power, the AC power is first converted to HVDC power. After transmission over HVDC lines to an end user, the HVDC power is converted back to lower voltage AC power. These conversion processes have large losses and are costly. Thus, the conversion process is generally only economical when transmitting high power, high voltage DC over long land distances using "classical" line commutation converter (LCC) technologies.

When transmitting power over distances greater than 25 miles using marine cables, the reactive AC current in the cable forces the use of DC transmission. The use of such lower power DC cables is becoming prevalent as more wind power generators are installed off-shore.

One conventional type of power converter used for lower power DC transmission is the PWM voltage source converter (VSC). PWM voltage source converters have higher losses than "classical" line commutation converters, but are often more cost effective for lower power levels.

The major losses of high voltage PWM voltage source converters generally arise from turn-on and turn-off switching losses due to the "hard-switched" (HS) topologies of the converters. The switching losses drastically increase as the voltage rating of the converter switches increases. The switching losses also increase proportionally with the switching frequency of the converter. An increased switching frequency not only adds to the system losses, but also prevents the converter designer from using higher voltage (6.5 kV and potentially higher in the future) solid-state devices, since for a minimum required switching frequency, a junction temperature of a conventional switching device will exceed a safe operating temperature. The limitation imposed by high converter switching frequencies forces the use of a number of lower voltage devices in series to yield the required voltage hold-off requirement. Such an increase in the number of devices used in the converter design increases the size, cost, complexity, conduction losses, and system failure rate of the converter.

The DC to AC VSC revolutionized the variable speed control of industrial motors in the voltage range below 600 V. This resulted in the advancement of IGBTs as a work horse switch. However, the uses of this converter topology were found problematic for high voltage applications due to several well known switch limitations, dV/dt, standing voltage waves, and other reasons. In addition, the poor efficiency of VSC converters due to hard switching losses makes VSCs unattractive for efficient utility power conversion applications. To use VSCs for higher voltage traction motor applications a number of advanced multi-level VSCs have been devised. For example, U.S. Pat. No. 6,005,788 to Lipo proposed a multi-level DC to AC converter using multiple DC power sources and a number of series connected hard switched converters in a hybrid PWM configuration "connected set of H-bridge inverters".

The elimination of the multiple DC power sources has been advanced by the various "Diode Clamped Multilevel Inverters", such as those published by Xiaoming Yuan. In general, Diode Claimed Multilevel Inverters operate as DC to AC converters in a PWM mode.

A multilevel converter for a single AC input phase AC to DC railroad traction application is described by Lue Meyses in U.S. Pat. No. 7,558,087 B2. The multilevel converter includes a number of transformers for galvanic isolation using a hard switched topology limited to a switching frequency "below 3 kHz".

Finally, many conventional systems are constructed with a number of switches directly connected in series to yield the necessary full voltage hold-off requirement. The switches need to be accurately turned-on and turned-off simultaneously to dynamically share the voltage of the stacked switch assembly. This requirement on switch timing is a large system risk and causes a majority of system failures.

SUMMARY

In a general aspect, a charge transfer apparatus for transferring an electric charge between an input power terminal and a galvanically isolated output power terminal includes a transformer including a plurality of primary windings and a plurality of galvanically isolated secondary windings, a first plurality of resonant converters having input terminals connected in series to the input power terminal and having output terminals connected to different primary windings of the plurality of primary windings, a second plurality of resonant converters having input terminals connected to different secondary windings of the plurality of secondary windings and having output terminals connected to the galvanically isolated power terminal, and a control system for controlling the transfer of electric charge between the input power terminal and the galvanically isolated output power terminal including controlling a first plurality of switches of the first plurality of resonant converters and a second plurality of switches of the second plurality of resonant converters in a zero current soft switching mode.

Embodiments may include one or more of the following features.

The input terminal may be configured to receive voltages in the range of 600V to 1000 kV. The control system may control the first and second plurality of switches according to a predefined switching sequence. The transformer may be a high frequency transformer operable at frequencies up to 50 kHz. The apparatus may include a plurality of transformers, each including a plurality of primary windings and a plurality of galvaincally isolated secondary windings. The apparatus may be configured for transferring charge bidirectionally between the input terminal and the galvanically isolated output power terminal. The output terminals of the second plurality of resonant converters may be connected in series to the galvanically isolated output power terminal.

The input power terminal may be a DC power terminal and the galvanically isolated output power terminal may be a DC power terminal. The input power terminal may be a DC power terminal and the galvanically isolated output power terminal may be an AC power terminal. The input power terminal may be an AC power terminal and the galvanically isolated output power terminal may be a DC power terminal. The input power terminal may be an AC power terminal and the galvanically isolated output power terminal may be an AC power terminal.

In another general aspect, an n phase charge transfer apparatus includes n charge transfer apparatuses connected to an AC grid. Each charge transfer apparatus of the n charge transfer apparatuses includes a transformer including a plurality of primary windings and a plurality of galvanically isolated secondary windings, a first plurality of resonant converters having input terminals connected in series to the input power terminal and having output terminals connected to different primary windings of the plurality of primary windings, a second plurality of resonant converters having input terminals connected to different secondary windings of the plurality of secondary windings and having output terminals connected to the galvanically isolated power terminal, and a control system for controlling the transfer of electric charge between the input power terminal and the galvanically isolated output power terminal including controlling a first plurality of switches of the first plurality of resonant converters and a second plurality of switches of the second plurality of resonant converters in a zero current soft switching mode, wherein a smallest difference in phase angle of operation between the n charge transfer apparatuses is 360 degrees/n and the control systems of each of the n charge transfer apparatuses are configured to coordinate the n charge transfer apparatuses to operate as an n phase charge transfer apparatus.

Aspects may include one or more of the following features.

n may equal three, and the three phase charge transfer apparatus may be connected to the AC grid in a parallel DELTA configuration, and the control systems of the three charge transfer apparatuses may be configured to operate the three charge transfer apparatuses as a three phase AC to AC transformer. n may equal 3 and the n phase charge transfer apparatus may be connected to the AC grid in a rotating open DELTA configuration. The input terminals of each of the first and second pluralities of resonant converters may be AC terminals and the galvanically isolated output power terminals of each of the first and second pluralities of resonant converters may be DC terminals. The input terminals of each of the first and second pluralities of resonant converters may be DC terminals and the galvanically isolated output power terminals of each of the first and second pluralities of resonant converters may be AC terminals. The control system may be configured to operate the system as a VAR compensator.

In another general aspect, a soft switching high voltage power converter is configured in a universal "electronic transformer" configuration with voltage step-up or step-down. This technology is applicable for medium and high voltage DC transmission converters changing AC to high voltage DC, transforming DC to DC, transforming AC to AC, and converting high voltage DC to AC.

The soft switching high voltage power converter includes a stack of zero current soft switching (ZCSS) converters that are integrated with a high frequency transformer operating at the converter frequency. The operation of the ZCSS converters eliminates switching losses that are present in conventional high voltage power converters by only triggering the switches in the converter when the current flowing through the switches is zero. The use of ZCSS converters in high voltage power converters is particularly advantageous when compared to the conventional zero voltage soft switching (ZVSS) converters used in conventional high voltage power converters. In particular, ZVSS converters only trigger their switches when the voltage applied to the switches is zero. Zero voltage switching requires all conventional ZVSS converters to include additional Zero Voltage Switching-assistance networks that add to the complexity of the converters, reduce the reliability of the converters, and cause additional losses in the converters.

The high voltage power converter including ZCSS converters facilitates the use of higher voltage solid state switches operating at high switching frequency with a significant reduction of total switching losses. With the integrated transformer operating at the inverter frequency, the transformer core size is significantly reduced permitting a cost-effective utilization of high quality core material.

A high voltage input to the soft switching high voltage power converter and an output of the soft switching high voltage power converter is divided evenly among the stacked SS converters. The architecture of the soft switching high voltage power converter permits a reduced switch trigger synchronization requirement, thus eliminating the stringent switch triggering requirements of the series connected switches used in conventional high voltage power converters. This approach allows the soft switching high voltage power converter to use the highest voltage solid state switches currently available such as Insulated Gate Bipolar Transistor (IGBT), Integrated Gate-commutated Thyristor (IGCT), Gate Turn-off Thyristor (GTO), Silicon-Controlled Rectifier (SCR), and newer Silicon-Carbide devices, thereby minimizing the total number of solid state switches and stacks of modules.

The soft switching high voltage power converter is designed around the voltage rating of the selected high voltage switches such that no series connected switch configurations are required in the soft switching high voltage power converter.

The output of the soft switching high voltage power converter uses an isolated transformer winding, providing full galvanic isolation between the input and output power terminals of the power converter. The secondary of the transformer can also have multiple windings with stacked output sections. The output section of the converter can be configured for passive rectification, active rectification or the reconstruction of either a single-phase or three-phase AC reconstruction section.

Module sections can either be paralleled or stacked, depending on the transformation requirement. This stacking approach can be used for DC to DC, DC to AC, AC to DC or AC to AC operation. With the high frequency transformers multiple galvanic and also additional isolated power sections can be implemented.

The proposed high frequency converter topology has an almost instantaneous turn-off capability, thus facilitating fault current protection for either AC or DC terminal connections.

With the elimination of the switching losses, the high voltage switches can be operated at full power at a high switching frequency unlike that of the standard Pulse-Width Modulation (PWM) converter. Since the integrated transformer is operated at the converter frequency, the size of the transformer core, windings, and the complete transformer package is reduced by more than an order of magnitude.

With the elimination of the switching losses, the soft switching topology is competitive with standard line transformers, while providing voltage regulation, VAR compensation, harmonic filtering, and full load electronic circuit breaker action.

A zero current soft switching resonant converter technology is described in U.S. Pat. No. 6,118,678 (hereinafter the '678 patent) which is assigned to the inventor listed on this application and is incorporated herein by reference. An advanced version of this technology is filed as a U.S. patent application with Ser. No. 13/788,718 (hereinafter referred to as '718) and is incorporated herein by reference.

The converter topology of the '678 patent is such that it turns on and off at zero current and requires only closing of switches and does not require actively opening the switches. This functionality can be obtained by using thyristor type switches. However, any high voltage switch can be used such as IGBT, IGCT, and GTO with the device off-gating after the resonant current becomes zero.

The technology described in '678 and '718 is a resonant converter topology which is naturally "soft switching". (i.e., it uses a solid state, soft switching operation with no switch turn-on and no turn-off losses, unlike most conventional converter technologies). This permits the '678 systems to use high voltage solid state power devices and run at high converter frequencies (up to 20 kHz using IGBTs).

It should be noted that the operation of solid state switches (e.g. IGBT) is limited by the maximum heat ($P_{thmax}$) that can be removed from the device in order to maintain the junction temperature at or below a defined maximum safe and reliable operating temperature. The junction loss equation has the simplified form of:

$$P_{thmax} = A*I + B*I^2 + (C_{ton} + C_{toff})*V_s*I*F_s \qquad (1)$$

Note that the first two terms are the conduction loss and the third term describes the turn-on and turn-off switching losses. The constants are defined by the device characteristics. As can be seen, the first two terms are proportional to the switch current which in turn are proportional to the switch power being controlled. The first two terms of the equation are independent of the converter frequency. Thus, the first two terms are the losses for a soft switching converter since the third term, proportional to the converter frequency "$F_s$" and switch recovery voltage "$V_s$", drops out.

For the hard switched topology, the conduction losses remain similar with that of the "soft switching" topology and the switching losses from the third term are added. These switching losses increase linearly with the switching frequency "$F_s$" and the device recovery voltage "$V_s$". Since the junction temperature has to be maintained below a reliable value, such as 125° C. for silicon devices, the switch current "I" in Equation (1) needs to be reduced as the switching frequency of the hard-switches and the voltage is increased.

For example, using a typical 6.5 kV IGBT, the switching losses and conduction losses are about equal at 400 Hz for a PWM converter. A 400 Hz switching frequency is too low a switching frequency for most converter operating requirements. Thus, one is forced to use a number of lower voltage switches that are capable of being switched at higher switching frequencies. This is not the case for the 'soft switching' '678 and '718 converters since the second term in Equation (1) is zero, and the full thermal switch capacity can be used at any practical switching frequency. The converter described in the '678 patent has demonstrated this feature at switching frequencies up to 20 kHz.

The specification of '678 describes a soft switching resonant charge and resonant discharge cycle. Each resonant cycle uses a resonant inductor in conjunction with a central capacitor. By replacing the discharge inductor with the leakage inductance of the a single phase transformer, the transformer is operated at the inverter resonant frequency, while the half-sine current pulse output can be stepped up or stepped down with the selection of the transformer ratio. This current pulse is used to either reconstruct a regulated DC or a low frequency AC source as required. Since this transformation is performed at high frequency, the transformer core area is inversely proportional to the inverter frequency, yielding a low weight transformer. For example, the total transformer weight of a 250 kW transformer with a 50 kV reconstructed DC output weighs a total of 26 lbs. for a power weight density of ~50 kg/MW.

The combination of the '678 and '718 converter topologies with this single phase transformer implementation replaces conventional large AC-HVAC step-up transformers and AC-DC rectifiers. The same functional combination is obtained as the HVDC is stepped down and converted to a low frequency AC. Since the transformer core weight per kW is small, it becomes economical to replace the low frequency transformer core material with more costly amorphous core material for a significant reduction of total core losses. The single phase transformer also provides complete galvanic isolation between the input and output terminals of the soft switching high voltage power converter.

In the field of high voltage DC transmission, both the classical HVAC LCC (Line Commutation Converters) and the HVDC VSC (Voltage Source Converter) require connection and simultaneous triggering of a large number of high voltage, series connected switches. This requires accurate voltage division and trigger synchronization for both the turn-on and turn-off modes. For high frequency operation, snubbers are required and cause additional losses and further reduction in efficiency. Any unsynchronized trigger to a switch in the high voltage chain will result in over-voltaging and destroying the switch. This is a major source of HV converter failures. The problem of unsynchronized triggering of switches has been eliminated by the proposed HVR-Link™ architecture which is described in more detail below.

The HVR-Link™ architecture, with the use of a single phase transformer, uses a number of isolated primary and secondary windings. Each winding voltage is selected to operate with a '678 or '718 converter that may not require any series connected switches. Therefore, each switch does not require accurate switch synchronization, eliminating the need for high voltage snubbers. Should a failure occur, the defective modules may be switched out for subsequent pulses with a redundant stage assuming its function. In addition, the multi-winding operation reduces the voltage rate-of-change (dV/dt) of the transformer windings, thus reducing the transformer insulation failure probability.

With the above features, the HVR-Link™ can be configured as an AC-HVDC step-up converter for DC transmission and subsequent HVDC-AC conversion. The system may be configured to be bi-directional if required. Furthermore, such a system may be configured for direct high voltage DC to high voltage DC transformation/conversion. This permits HVDC transmission with voltage step-down to medium voltage DC. Unlike most classical systems, the HVR-Link™ is not restricted to a point-to-point DC operation. Any number of converters can be connected to the HVDC line. With the addition of a HVDC-MVDC converter, a complete DC network can be constructed with DC power coming all the way to the high power consumer. Since the majority of loads are variable speed motors, a DC ring-bus may provide DC power to run standard variable speed drives. The remaining Power may be converted to AC for standard loads.

In addition, the same architecture may be used as a high voltage AC to AC transformer, replacing the large line frequency transformer with a much smaller "electronic transformer" with voltage regulation capability, VAR neutralization, and high current fault protection.

In addition, the HVR-Link™ system is a resonant inverter with current going to zero at the end at the conclusion of each resonant operation. If a load fault or component fault is detected, subsequent triggers to the switches are stopped and the system becomes an electronic contactor. In the case of a line fault, once the fault clears, the line can be tested by slowly ramping up the voltage, before full power operation continues.

There is a need for topologies which have the combined capability of soft switching, high frequency voltage transformation with integrated high frequency transformers, elimination of all series connected switches with accurate voltage grating and highly accurate switch synchronization for operation such as direct DC to DC, DC to AC, AC to DC, and AC to AC transformation without going through some sort of DC link.

Other features and advantages of the invention are apparent from the following description, and from the claims.

DESCRIPTION OF DRAWINGS

FIG. 5(*b*) is a bidirectional three-phase AC terminal

FIG. 6(*b*) is a diode rectification.

FIG. 6(*c*) is a diode bridge rectification.

DESCRIPTION

1 Generic Topology

Figure 1:
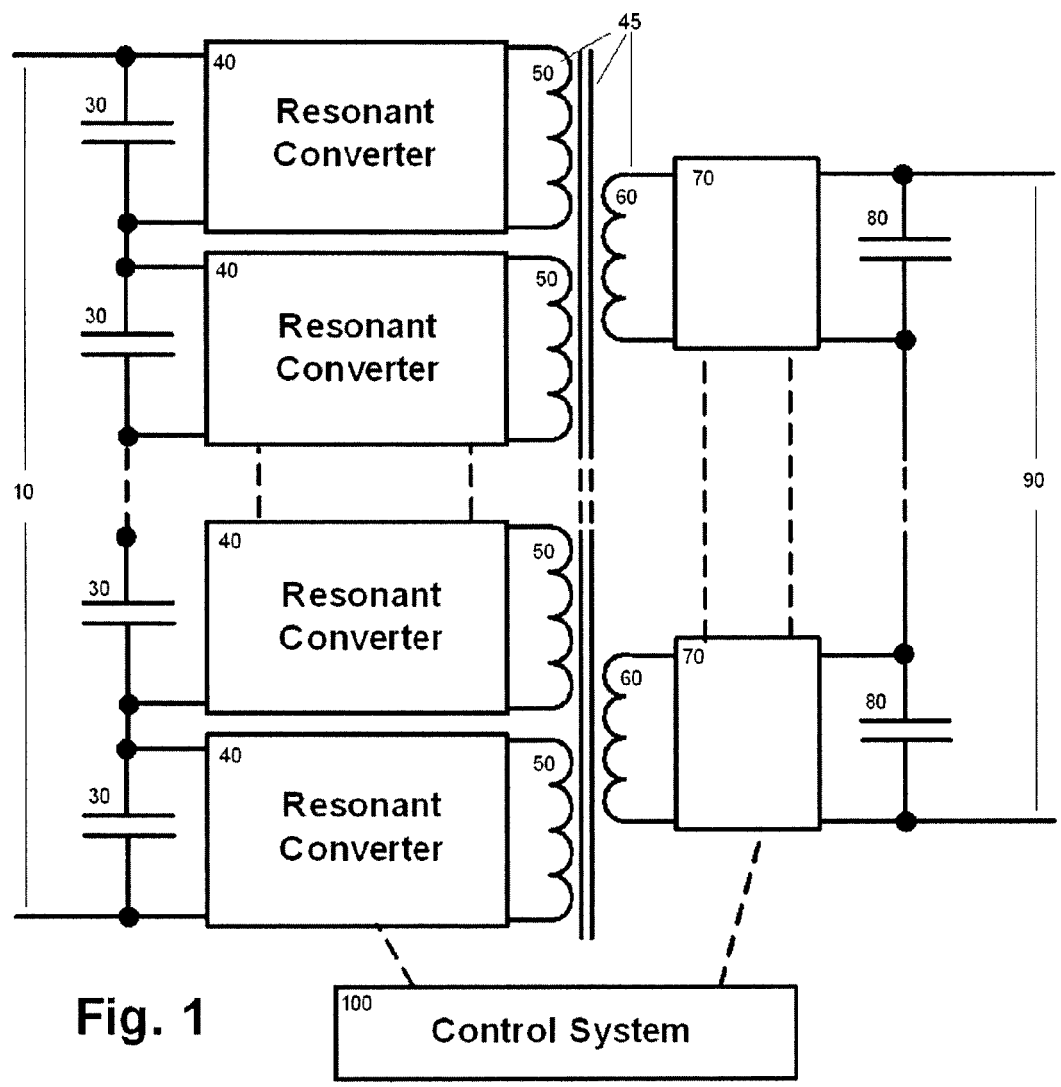
FIG. 1 is a generic stacked resonant converter configuration.

Referring to FIG. 1, a generic converter topology includes a high voltage (HV) input terminal 10 and a galvanic isolated output terminal 90. One or more single phase transformers 45 provide galvanic isolation and voltage transformation capability. A number of series connected energy storage devices, such as capacitors 30 provide a controlled voltage to a cascade (or stack) of soft switching resonant converters 40. An output of each resonant converter 40 in the stack is connected to an isolated transformer winding 50. A transformer secondary 60 also has multiple isolated transformer windings connected to a secondary resonant converter section 70, with its output connected across a number of output capacitors 80. These capacitors may be connected in series as shown in FIG. 1 for a high secondary output voltage 90 or connected in parallel for a lower voltage output with higher current requirement. The number of primary resonant converter sections 40 and secondary converter sections 70 does not have to be identical.

The stacked resonant converters 40 are controlled by a centralized control system 100. The control system 100 monitors the voltages and currents in the resonant converters 40 and triggers the switches in the primary resonant converter section 40 and the secondary resonant converter section 70 in the appropriate order.

The detailed configuration of the resonant converters 40, 70 depends on the operational requirements of the overall converter system. A number of resonant converters are described in '678 and '718. For some applications, other resonant converter topologies can be used, including hard-switched resonant converter sections.

The transformer 45 provides galvanic isolation, voltage transformation, and also serves as an electrically resonant component during operation of the resonant converter. With the use of the common transformer core, the inverters are magnetically coupled. In some examples, more than one transformer is used.

In some examples, the use of a magnetic transformer core adds complexity to the converter system and core saturation needs to be considered. Therefore, a transformer may be implemented in a push/pull operation with consecutive energy transfer alternating the flux in the transformer core.

In some examples, when controlling the core flux reversal with alternating converter operation is undesirable, core-reset control can be used. This has been demonstrated with the '678 converter topology in U.S. Pat. No. 8,000,118 B1 (herein referred to as R-Link™).

In some examples, each resonant converter 40 in the stack of resonant converters operates with a voltage transformation defined by the transformer turns-ratio. In other examples, each resonant converter 40 of the stack of resonant converters is configured as either a buck or boost mode converter to implement a controlled voltage transformation. Such a configuration may require additional converter components that are described in '678 and/or the description of the R-Link™ converter. In some examples, the resonant converters 40 are configured for both boost and buck operation. This permits voltage regulation over a large voltage range, and for most applications, a regulated output with a large range of input voltage swing. The '678 and R-Link™ specifications describe operations with either AC or DC input, AC or DC output, as well as bi-directional power flow control. All of these features can be implemented with the topology proposed in this specification. Furthermore, a multi-port operation is possible with all of the individual sets of terminals fully galvanically isolated and with any of the sets of terminals providing AC, DC, or power storage capability.

The number of possible converter configurations is so large that it is impractical to cover all of the possible configurations in this specification. Instead, a number of examples which are specifically geared to medium and high voltage power transmission applications are presented. It is noted that the examples presented herein are not exhaustive and the concepts and techniques applied herein are applicable to many other applications that are not covered in this specification.

One especially useful application of soft switching high voltage power converters is for utility power transmission and transformation with DC to DC transformation, regulation, and fault isolation being an important subset. However, AC transformation is also covered herein. For any of these operations the low frequency power transformer used by conventional high voltage power converters is eliminated and fault interruption is implemented by stopping triggering of the switches. However, all of these applications have in common a circuit topology that does not require series connected switches with highly accurate, synchronized switch triggering.

2 Converter with DC to DC Operation

Figure 2:
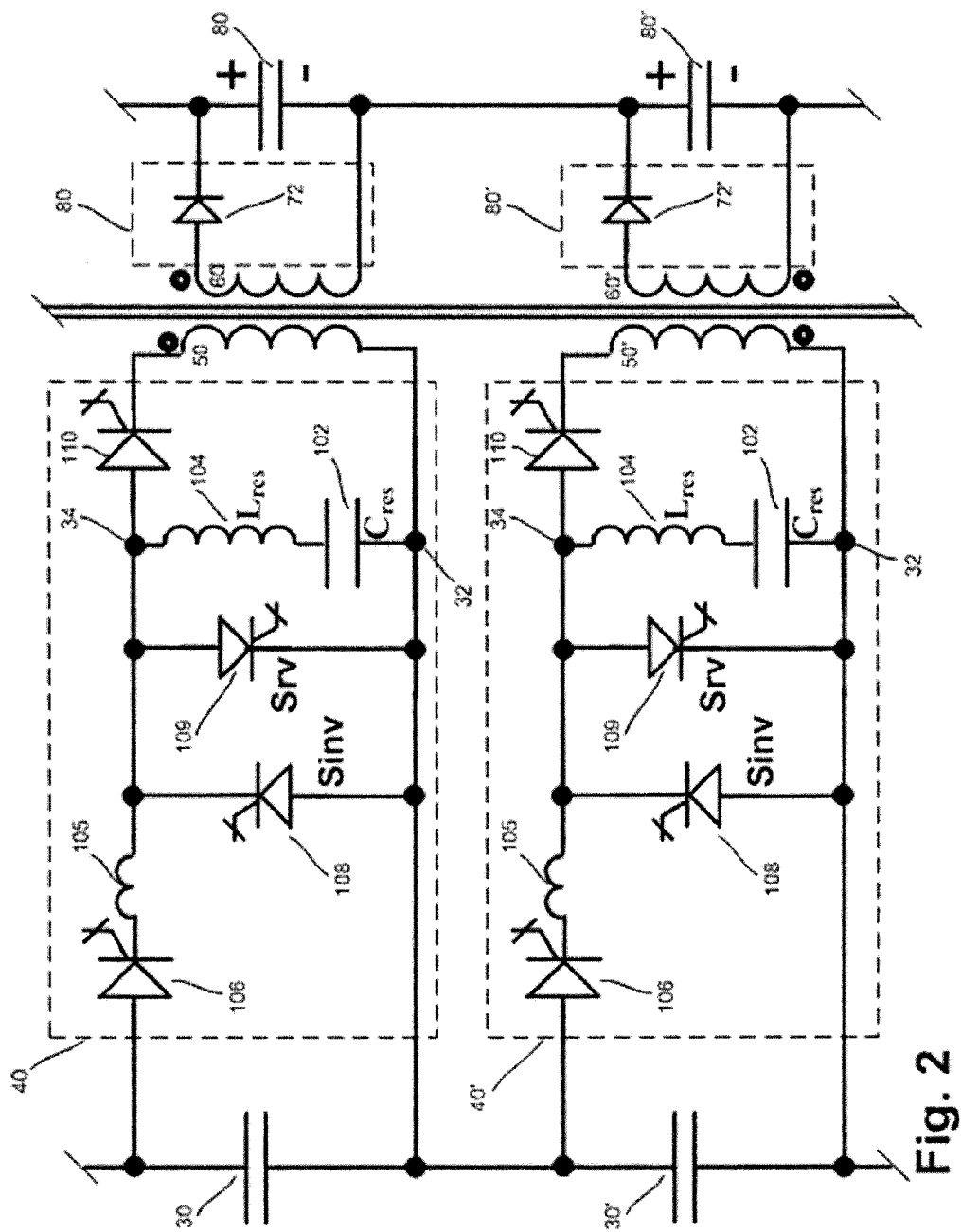
FIG. 2 is a simplified DC to DC voltage transformation configuration.

Referring to FIG. 2 a soft switching high voltage power converter is configured for DC to DC voltage transformation. A converter section 40 is connected to a series connected capacitor 30 at its input terminal and to a primary transformer winding 50 at its output terminal. A secondary winding 60 is connected to a diode 72 in series with an output filter capacitor 80. Under steady state operation a resonant capacitor $C_{res}$ 102 has a negative residual voltage $V_{cres}$. For buck mode operation, an inversion switch $S_{inv}$ 108 is triggered to invert the negative capacitor $C_{res}$ voltage through a resonant inductor $L_{res}$ 104. The inversion operation is stopped when the input switch 106 is triggered, back biasing the inversion switch 108. The resonant charging operation continues charging the resonant capacitor $C_{res}$ 102 through the inductor 105 and the resonant inductor 104, using the input voltage $V_{in}$ from the capacitor 30. The total resonant charging inductance is the sum of the inductances of the resonant inductor 104 and the inductor 105. The charging process is completed when the resonant current reaches to zero, since all of the switches shown are reverse-blocking. The voltage on the capacitor is defined as $V_{co}$.

Immediately after the charging operation is completed, a discharging operation is initiated by triggering the output switch 110, placing an output voltage of $V_{out}$ on the rail terminals 32 and 34, the output voltage defined by the transformer turns-ratio and voltage on the output filter capacitor 80. The resonant discharge inductance is the sum of the transformer leakage inductance (not shown) in series with the resonant inductance 104. The resonant period is defined by the transformer leakage inductance and the resonant inductance 104. It is the objective to maximize the resonant inductance 104, such that the "rail" voltage between the terminals 32 and 34 can be minimized during the charge and discharge, as is described in specification of '718. With the inductance 104 defined, the series charging inductance 105 is defined by the desired charging period.

In FIG. 2, two input stages and two output stages share the transformer core. As the upper input stage 40 discharges into the transformer winding 50, the lower input stage 40' is charged from the input capacitor 30'. Once the discharge of the upper input stage 40 is completed and the lower input stage 40' is charged, the roles are reversed and the lower stage discharges into the primary transformer winding 50' resulting in a flux reversal in the transformer core and, with the transformer winding polarity shown, causes current to flow through diode 80', causing a charge transfer into the secondary capacitor 80'. The second transformer winding 60' is optional and the winding 60 could be used alone if the rectification section 80 were replaced with a full bridge rectifier.

Since the primary and secondary windings share the same core, the number of primary and secondary windings is not one to one and is only determined by the step-down ratio, and other system requirements.

The power throughput regulation can be determined by the energy per pulse $E_p$ requirement and is given by Equation (1) defined by energy conservation:

$$E_p = E_{in} = E_{ot} = V_{in} * Q_{in} = Q_{ot} * V_{ot} \qquad (1)$$

From charge conservation:

$$Q_{in} + Q_{inv} = Q_{ot} \qquad (2)$$

The resonant output equations are given by Equation (3) and from Equation (3) the required $C_{res}$ charge and residual voltages can be computed;

$$V_{cr} = 2V_{ot} - V_{co} \qquad (3)$$

$$V_{co} = E_p/(2C_{ref} * V_{ot}) + V_{ot} \qquad (4a), \text{ and}$$

$$V_{res} = V_{ot} - V_{ot} E_p/(2C_{ref} * V_{ot}) \qquad (4b)$$

To regulate the power throughput and the energy per pulse $E_p$, the $V_{ot}$ is obtained by inversion by effectively reducing the negative residual voltage $V_{res}$ to the effective residual voltage, $V_{reff}$. This value is computed using Equation (5).

$$V_{reff} = 2V_{in} - V_{co} = 2V_{in} - E_p/(2C_{ref} * V_{ot}) + V_{ot} \qquad (5)$$

The parameter for $V_{reff}$ is a function of the known energy per pulse $E_p$, input voltage $V_{in}$, and output voltage $V_{ot}$. The triggering timing of the input switch can be computed in real time or recalculated and stored into lookup tables. These tables can be corrected in a closed-loop operation.

For boost mode operation, the inversion operation is replaced with a reversal operation. The charge conservation Equation (2) is replaced with the requirements of Equation (6):

$$Q_{in} = Q_{ot} + Q_{rev} \qquad (6)$$

This requires that the charge operation is followed by the discharge operation. However, the charge operation is interrupted with the triggering of the reversal switch S. Using the resonant charging equation and conservation of energy, the residual capacitor voltage $V_{res}$ and the Vco charge voltage are computed as:

$$V_{res} = V_{in} - E_p/(2C_{ref} * V_{in}) \qquad (7a)$$

$$V_{co} = V_{in} + E_p/(2C_{ref} * V_{in}) \qquad (7b)$$

To obtain the required residual voltage given by Equation (7a), the reversal switch is triggered at a $C_{res}$ voltage which reduces the charge transfer to the output. This voltage is given by Equation (8):

$$V_{rt} = V_{co} - E_p/(C_{ref} * V_{ot}) = V_{in} + (E_p/C_{ref})(1/(2V_{in}) - 1/V_{ot}) \qquad (8)$$

If the resonant voltage is known, the time dependent resonant voltage and current equation can be used top determine the triggering requirement on the basis of discharge current or to determine the triggering time for the reversal switch. This selection is best made based on what is most convenient for the diagnostic and control implementation.

3 Simplified HVDC-DC Operation

Figure 3:
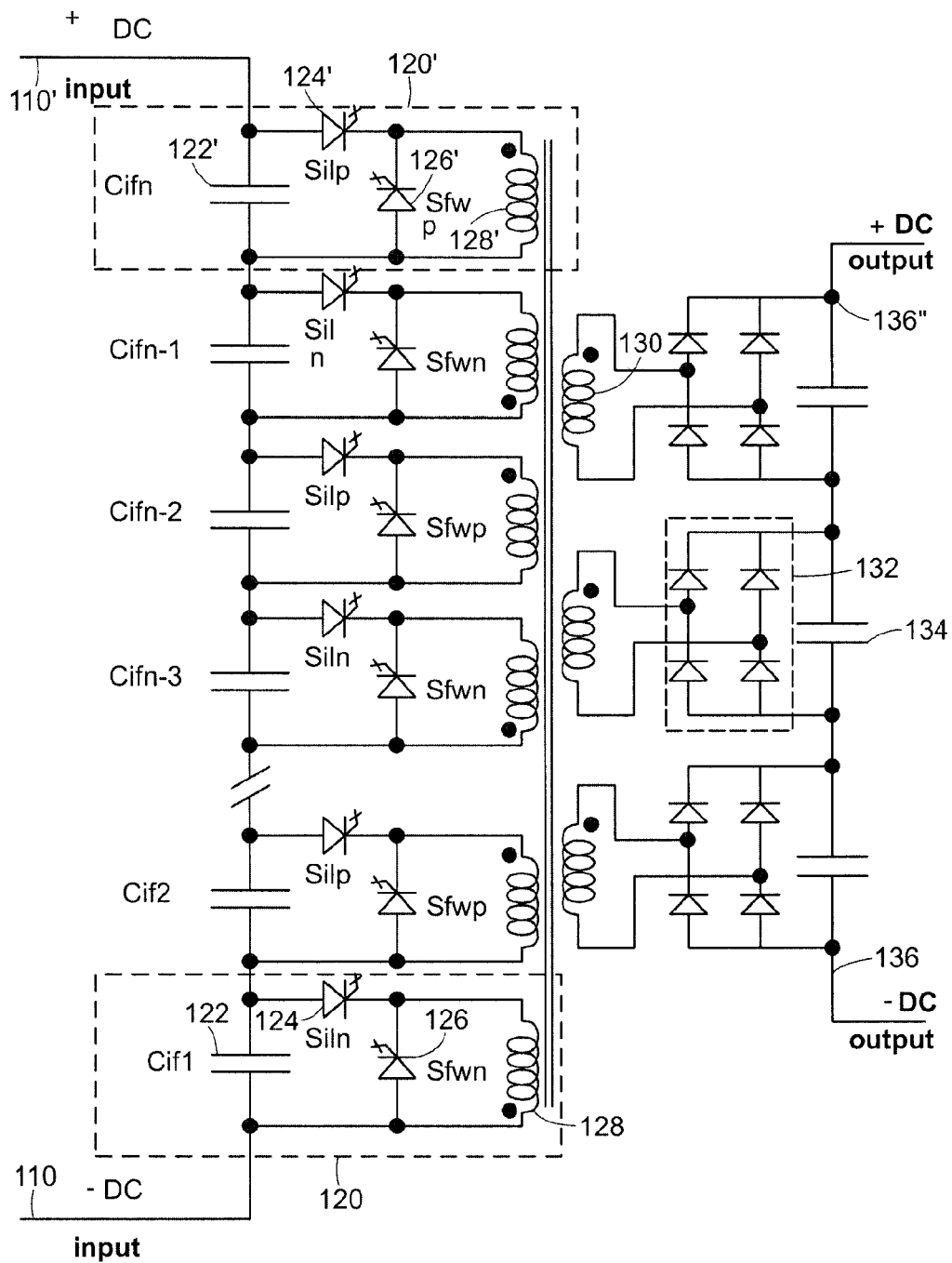
FIG. 3 is a simplified HVDC to DC voltage converter.

Referring to FIG. 3, an alternative architecture reduces the resonant operation to a single cycle. The input terminal voltage between terminals 110 and 110' is divided between a number of capacitors 122 and 122' of equal capacitance. The capacitors are part of the resonant converters 120 and 120'. With the input voltage maintained at a constant value by a stable DC source or with additional filter capacitors, the voltage across any pair of the capacitors 122 and 122' remains substantially constant. Turning on the discharge switch 124' causes the capacitor 122' to discharge with a predetermined voltage through the transformers, wherein the voltage is rectified by a bridge circuit 132 and charges all of the output filter capacitors 134. The transformer is designed to have a specific turn-ratio and a leakage inductance that provides, in conjunction with the capacitors 122 and 122', a specific resonant period.

With the primary transformer windings 128 and 128' having opposite polarity, the flux is reversed with alternating the operation of the converters 120 and 120'. With the voltage across the set of capacitors 122 and 122', the voltage of the other capacitors increases or automatically recharges during alternation of the converter operation. The switches 126 and 126' are free-wheeling switches and if triggered at the end of the discharge, reduce the energy throughput by controlling the amount of voltage reversal of the active capacitors 122 or 122'. This limits the energy per pulse and with the selected converter frequency controls the power throughput. Small commutation capacitors (not shown) control the slope of the current, dI/dt, of the free-wheeling switches.

The transformer is operated at the converter frequency, minimizing the size of the transformer core and with it the transformer weight, volume, and cost.

The number of primary and secondary stages is defined by the switch voltage rating of the input switches 124 and 124'. This architecture requires no series connected switches and accurate triggering of the input switches is not required. This not only protects the switches but also limits the voltage requirements on all of the passive components. In addition, no snubbers are required that would consume significant power when operating at high frequencies.

While the converter configuration shown in FIG. 3 is a one-directional HVDC to DC configuration, in some examples the DC output section may be replaced by an output port configured for AC reconstruction. Furthermore, a number of isolated AC or DC ports may be configured on the primary side.

4 Series Resonant Operation

Figure 4:
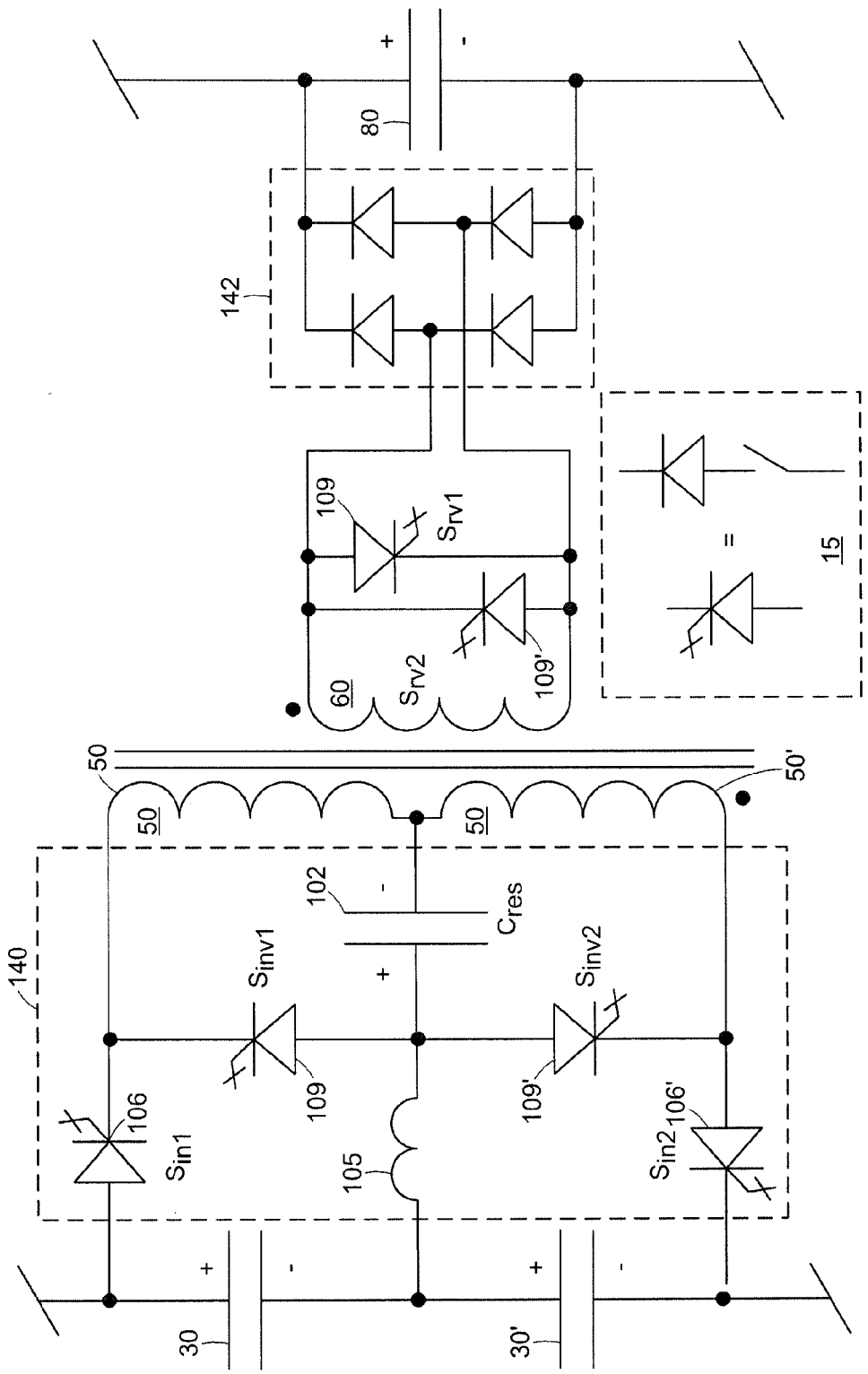
FIG. 4 is a simplified HVDC to DC series resonant converter.

Referring to FIG. 4, another example of a stacked converter architecture conforms to the generic approach outlined in FIG. 1 and includes a reverse blocking switch 15.

In operation, an input voltage is placed across a number of filter capacitors 30 and 30' and an input switch $S_{in1}$ 106 closes the resonant circuit consisting of a series resonant capacitor $C_{res}$ 102 and the leakage intendance of the transformer. With the full bridge circuit 142 in place, current flows into the secondary filter capacitors 80. In general, the transformer is wound with the desired turns-ratio and with a leakage inductance to obtain the required resonant period.

In this process the series capacitor resonant voltage $V_{srv}$ starts with a positive capacitor polarity as shown in FIG. 4 and the capacitor voltage reverses on each charge interchange.

The current is a half of a sine wave and yields a positive sine wave on the secondary winding 60. In the charge interchange the input switch $S_{in2}$ 106' is triggered, again reversing the polarity of the $C_{res}$ capacitor and produces, with winding configuration shown in FIG. 4, a negative current pulse across the secondary transformer winding 60. With the bridge circuit 142 in place, the secondary filter capacitor(s) 80 is again charged. The energy originates alternately from the set of input filter capacitors 30 and 30'. The energy per pulse is given by, $$E_p = 2 * C_{res} * V_{cin} * V_{srv} \quad (9)$$

where $V_{cin}$ is the input filter capacitor voltage.

To regulate the output, the system can be configured in a buck or boost mode. Without any regulation, the output voltage is proportional to the input voltage.

For the buck mode operation, the transformer winding ratio is selected with a lower turns-ratio and the charging process starts with triggering the inversion switch $S_{inv1}$ 109. As soon as sufficient residual capacitor voltage reversal is obtained, the input switch 106 is triggered, back biasing the inversion switch and turning it off. At that point the energy transfer proceeds until the current goes to zero. The longer the inversion switch remains on, the lower is the energy per pulse $E_o$ since it results in a lower $V_{srv}$ on subsequent pulses. For a negative pulse, the inversion switch $S_{inv2}$ 109' is turned on before the input switch $S_{in2}$ 106' is triggered. Also shown is a commutation inductor 105. It serves to lower the dI/dt during both the positive and negative inversion process and helps to ramp-down the inversion current as the input current ramps up.

Boost mode the operation is started by triggering the input switches 109 or 109' and the energy transfer is stopped at the end of the charge transfer by triggering the reversal switch $S_{rv1}$ 109 for the positive output pulse and $S_{rv2}$ 109' for the negative output pulse. The truncation of the output energy transfer increases the voltage $V_{srv}$. This increase can be computed based on the closed form expressions described below. Equation (1) and (2) apply for the buck mode and Equation (1) and (6) apply for the boost mode and, the mathematics of which are described below.

The transformer secondary output for FIG. 4 is configured as a full wave bridge rectifier. Half bridge rectification 80 as shown in FIG. 2 could also be used.

For high voltage operation any number of input stages 140 and output rectifier stages 142 can be used. Again a stage can be designed to require no series connected switches, reducing sensitivity of the system to inaccurate triggering timing. Of key importance is that the flux reversal occurs in the transformer core to minimize the core cross section. The energy per pulse per stage is given by Equation (8) and multiplying the energy per pulse per stage by the inverter frequency yields the converter stage power. For low power operation, one also has the option of not triggering all of the positive and negative converter pulses at all times. For example, with twelve dual input stages, all twelve stages can be triggered simultaneously, or six, four, three, two or one stage at a time with preferentially equal time intervals. This has the advantage of maintaining a high frequency in the output ripple, thereby reducing requirements for output and input filtering.

In some examples, the resonant capacitor $C_{res}$ does not have to be exclusively placed on the primary of the converter. Taking into account switch voltage rating and other considerations, some of the capacitance may be placed in series with the secondary winding 60. This is not shown in FIG. 4.

5 Bi-Directional Operation

Figure 5A:
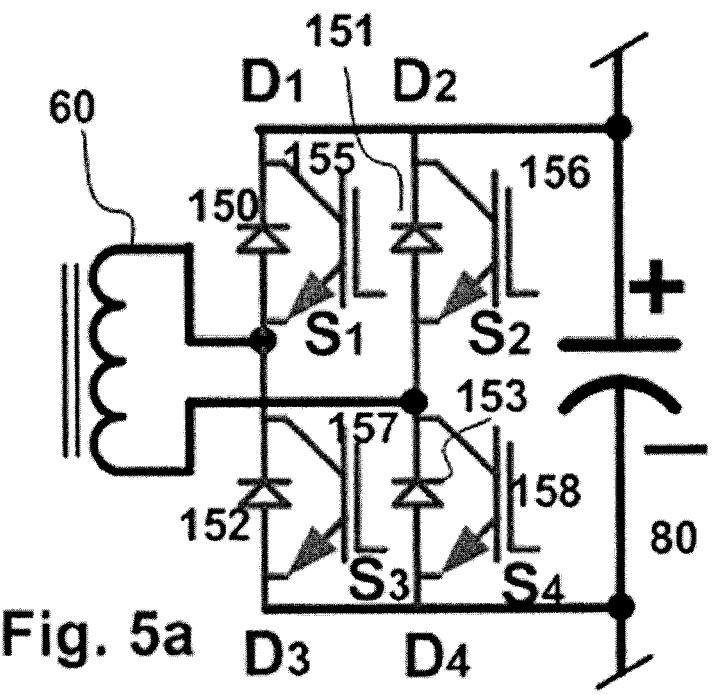
FIG. 5(*a*) is a bidirectional DC terminal.
Figure 5B:
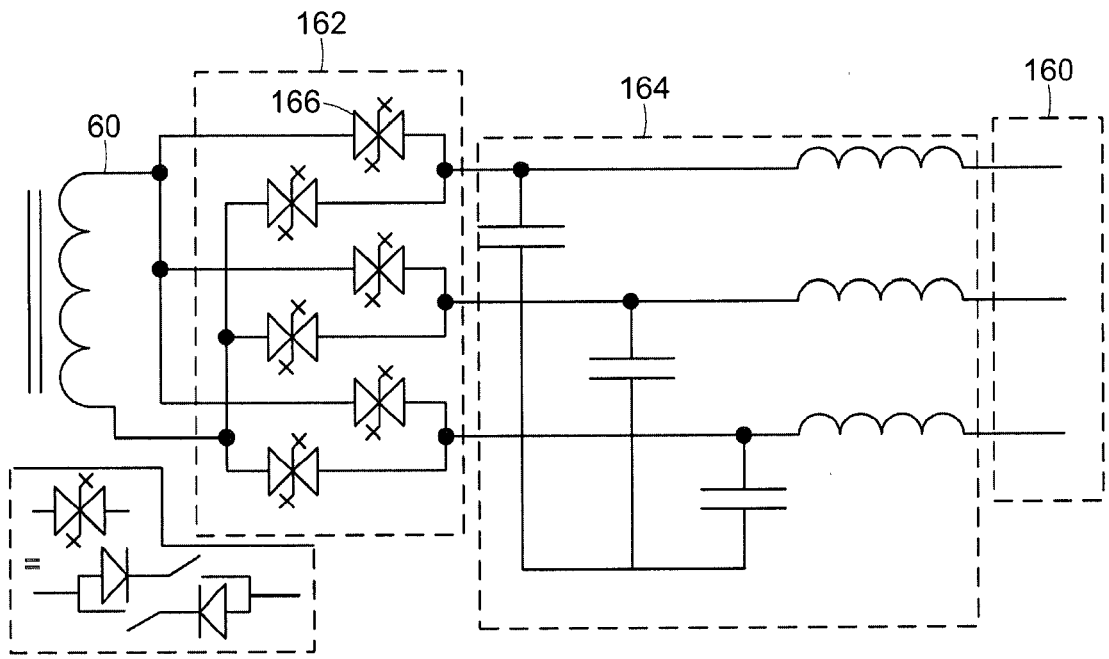

FIGS. 2, 3, and 4 show a one directional power flow from the left to the right of the figures. DC terminals are used as both the input and output for simplicity of illustration. However, the 678' and R-Link$^{TM}$ topology building blocks for FIG. 1 can be made to operate bi-directionally and with AC to DC terminals. FIG. 5a is a converter system configured with bidirectional DC terminals. FIG. 5b is a converter system configured with bidirectional three-phase AC terminals connected to one of the secondary windings 60.

Referring to FIG. 5a, four full-wave diodes are used for the passive DC regulation section 142 of FIG. 4, regulating the power flowing from left to right. Four additional switches, in the form of IGBT 155, 155, 155, and 155, are added for DC power flow control from right to left. As a practical converter, standard IGBT modules with anti-parallel diodes are used. This H-bridge configuration selectively applies the capacitor voltage 80 with either a negative or positive polarity across the secondary winding 60.

FIG. 5a also has the necessary switch configuration for regulating the power flow for the right to left boost operation. Turning on IGBT 156 at the end of a positive output pulse will truncate the power transfer through IGBT 156 and diode 150. The negative pulse power flow is truncated through diode 151 and IGBT 155. There is an additional switch-diode combination for both the positive and negative pulse.

The rectification/switching section of FIG. 5a is also capable of regulating right to left power flow when operating in buck mode. For example, for a positive input pulse to the secondary winding 60, the inversion is implemented with the triggering of IGBT 155 and shorting out the winding 60 with current flow through IGBT 155 and diode 151. To terminate the inversion, IGBT 158 is triggered applying the negative voltage to the lower terminal of winding 60. The current flow through diode 151 stops since the diode is back-biased and the normal left to right charge transfer starts.

For bi-directional operation, the leakage inductance of the transformer contributes to the effective resonant inductor and defines the resonant period. Having all of the resonant inductance available for the high frequency transformer design permits additional radial spacing between transformer winding and therefore higher voltage hold-off between the primary and secondary windings.

Referring to FIG. 5b, a portion of a converter topology is capable of three-phase AC reconstruction with an AC port as described in FIG. 1 of the '678 patent and FIG. 8b of the R-Link$^{TH}$ specification.

For three-phase AC reconstruction, on the left side of the circuit the positive and negative output current pulses of winding 60 are divided among the output switches to charge all three of the output filter capacitors in section 164 of the circuit. The phases are identified as "primary", "secondary", and "tertiary" with the primary phase carrying both the secondary and tertiary current. As described in greater detail below, the "primary" and "secondary" phases, with the higher differential voltage, are connected to the winding every 60 electrical degrees. Once sufficient charge is transferred into the "secondary" filter capacitor, the "tertiary" switch is triggered with the lower 'primary' to 'secondary' voltage. This back-biases the "secondary" switch, forcing it off and the charge transfer continues into the "primary" and "tertiary" filter capacitors. The charge transfer comes to an end as the resonant current goes to zero. The negative pulse follows the same procedure using different switches from the "AC-switch" configuration. The AC-switch is shown in FIG. 5b.

The reconstruction may control the output frequency and phase. The output section also provides real and reactive power as demanded by the load. If the output terminal frequency is established by other means, the system provides real and reactive power as controlled on demand. All of the operations are 'soft switching' with negligible switching losses, such that the converter can be operated at high switching frequency with the use of high voltage solid state switches.

In the configuration FIG. 5b, for left to right operation, there is a "primary", "secondary", and "tertiary" input phase. The "primary" phase is identified as the phase with the sum of the "secondary" and "tertiary" current. However, the "secondary" phase is defined as the phase that yields a lower differential voltage with the 'primary' phase. However, if we require inversion for buck mode operation, we trigger first two 'primary' switches, applying a zero voltage onto the winding 60. One of these switches is back-biased and turned off, as the 'secondary' voltage is applied. As sufficient 'secondary' charge is transferred, the 'tertiary' switch is triggered, turning off the 'secondary' switch. The operation stops as the resonant current becomes zero.

With the bidirectional switches of FIG. 5b the three-phase operation can be reversed with the proper sequencing of the switches. The three phases of the left hand AC section are defined on a pulse-to-pulse as input "primary", "secondary", and "tertiary" phases. The input power transfer starts out again with the 'primary'-'secondary' switch connection followed by the 'primary'-'tertiary' connection. However, for the input phase definition classification the 'primary'-'tertiary" voltage has to be higher in magnitude than the 'primary'-'secondary' voltage for commutation purposes. Again, for the proper charge transfer the commutation point in time defines the correct 'secondary' and 'tertiary' charge transfer. The input power control defines the transfer of real as well as the reactive power transfer as outlined by the descriptions in '678 and '112.

6 AC Transformation

The generic converter topology of FIG. 1 includes multiple converter sections on the left hand side and multiple converter sections on the right hand side connected in series, with the objective of eliminating high voltage solid state series connected switches. However, the topology does not specifically define the input 10 or 90 as AC or DC. FIGS. 2, 3, and 4 are various converter configurations with passive DC outputs. FIG. 4a illustrated a bidirectional left hand DC section with a passive DC output and an active bidirectional DC input.

FIG. 4b showed a configuration for a three-phase AC output with output voltage, output frequency, and phase reconstruction capability. With the AC-switch configuration, left hand section can also be controlled, providing power flow from left to right using the methods of '678 and '112.

Thus, all of the configurations illustrated up to this point imply that the input 10 in FIG. 1 is a DC input. However, the left hand section and the right hand section of FIG. 1 can both be connected to AC power. In such cases, the power flow can be regulated, the converter is soft-switching, the power flow may be bidirectional, and no switches have to be connected in series.

Figure 6A:
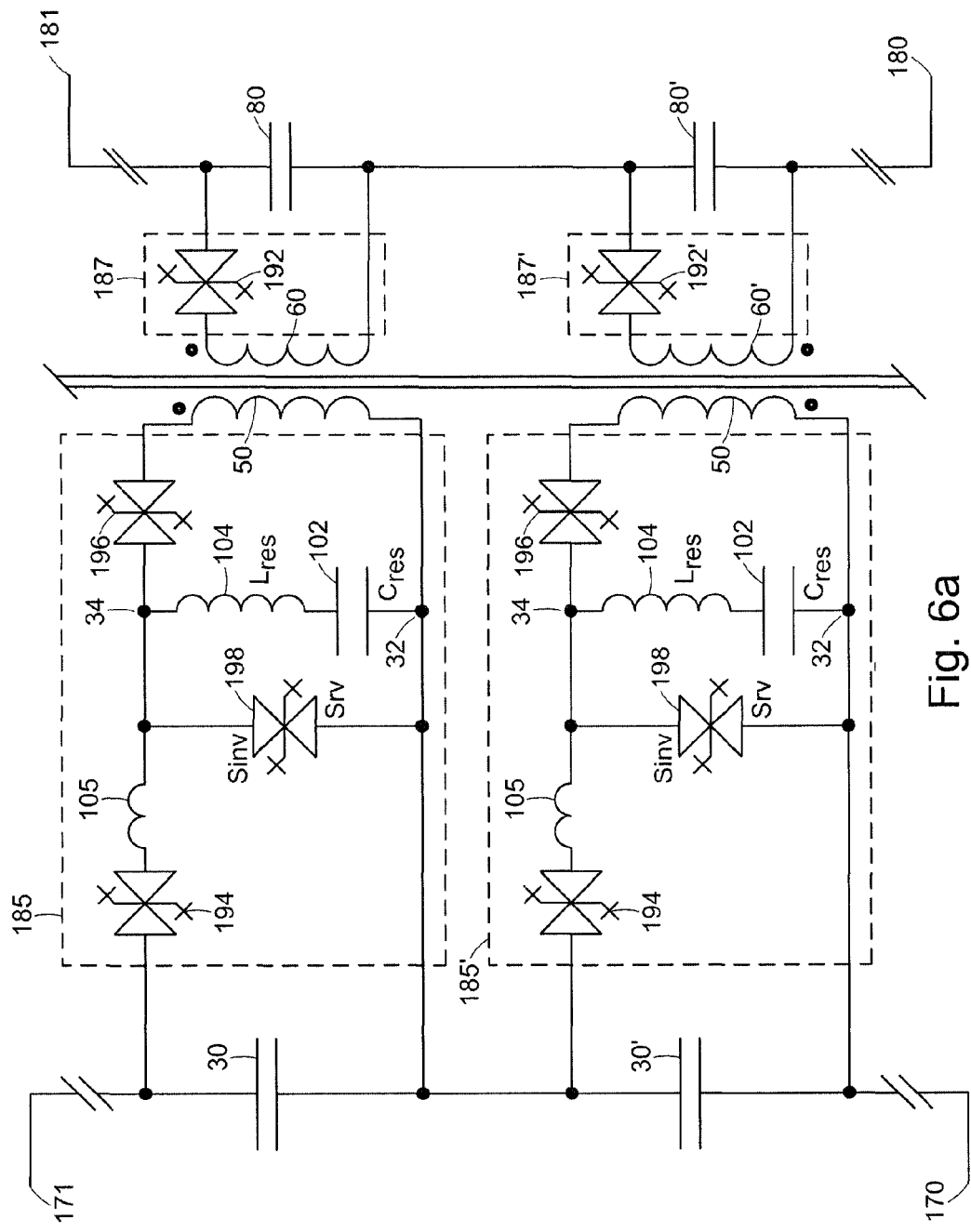
FIG. 6(*a*) is a bidirectional AC-AC, DC-DC, and AC-DC configuration.

Referring to FIG. 6a, the DC architecture of FIG. 2 can be converted to an AC to AC R-Link$^{TH}$ architecture with the capability of bidirectional operation. On the left side of the figure, the AC terminal voltage 170 and 171 is distributed across a plurality of $M_p$ filter capacitors 30 and 30', while on the right side the AC terminal voltage 180 and 181 is distributed across a plurality $M_s$ of right hand filter capacitors 80 and 80'.

The left hand converter section 40 and 40' of FIG. 2 is modified and shown as 185 and 185' with the replacement of the switches with bidirectional AC-switches as defined by FIG. 4.

The right hand switching section 80 and 80' is replaced by a modified switching section with the use of additional AC-switches 192 and 192' for bidirectional current flow. The architecture for the high frequency transformer is substantially the same.

The input switch 194 permits the charging of the resonant capacitor $C_{res}$ 102 with either a positive or negative 170, 171 terminal voltage and is discharged into the transformer winding 50 with the switch 196.

The inversion switch $S_{inv}$ 108 and the reversal switch $S_{vr}$ 109 of FIG. 2 are combined into the AC-switch 198 and allow the throughput control for both buck or boost mode operation.

The output voltage $V_{out}$ is proportional to the input voltage $V_{in}$ as given by Equation (10):

$$V_{out} = \pm CF^*((N_s M_s)/N_p M_p)) V_{in}(\omega t) \qquad (10)$$

with $N_s$ and $N_p$ being the transformer secondary and primary winding numbers respectively. With the Control Factor CF set to 1, Equation (10) is simply the ideal transformer voltage transformation. It should be pointed out that the transformer leakage inductance does not alter the output voltage over the full throughput power range, as is the case with a standard AC transformer. Therefore, the 'transformer regulation' is unity over the full power range, neglecting the resistive winding losses.

The ± of Equation (10) indicates that an output polarity can be the same or switched depending on the selection of the output switch triggering sequence. The + applies that the discharge operation of modules 185 and 187 is used while 185' is charging. If, however, 187' is triggered with modules 185, the output polarity is reversed at 180 and 181 with multiple sequential operations.

The control factor "CF" represents the buck or boost mode operational control by the switch 198. The "CF" is greater than 1 if the boost mode control is used, while for the buck mode the "CF" is less than zero. It follows that the configuration of FIG. 6a may be used for AC rectification as well as for AC to AC transformation with the output $V_{out}$ synchronized to the input $V_{in}$.

Figure 6C:
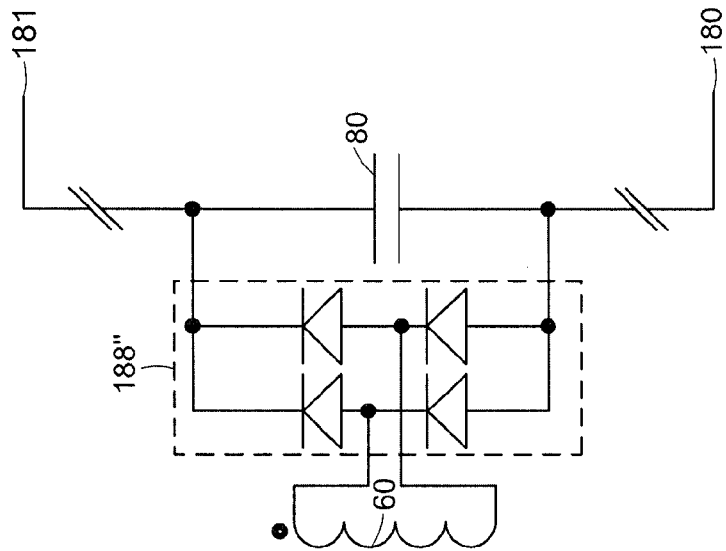
Figure 6B:
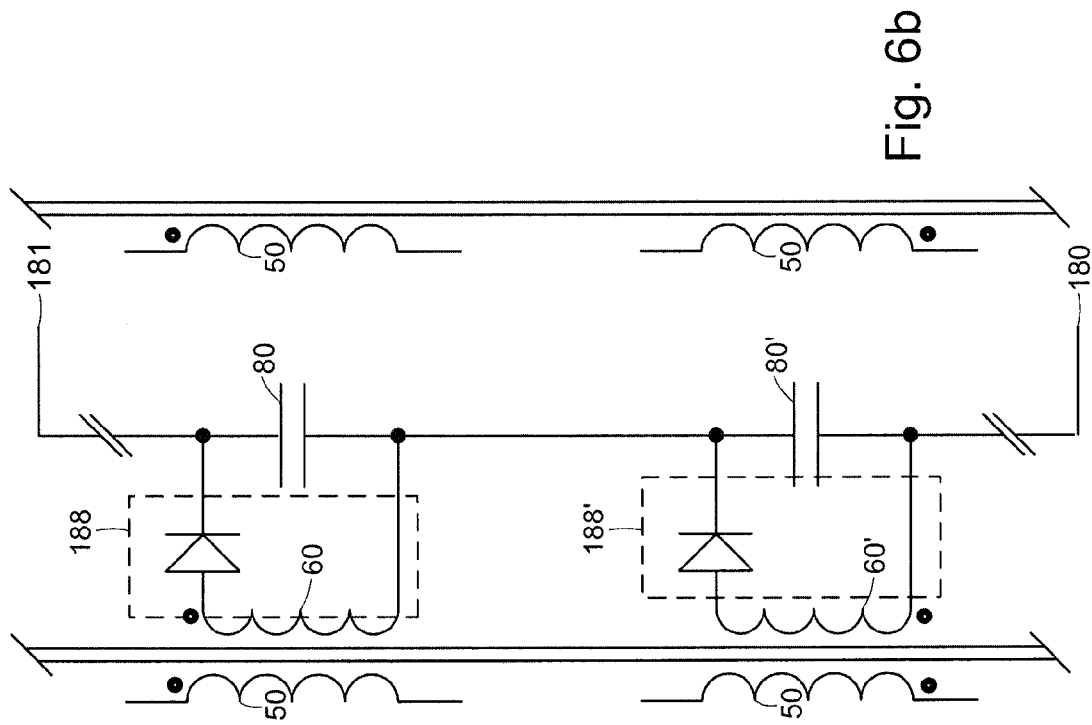

Referring to FIGS. 6b and 6c, a converter topology is configured for uni-directional operation with a single polarity of regulated DC output and either AC or DC input. The transformer flux is again reversible from pulse to pulse and FIG. 6b has a set number of windings with one diode rectifying the positive pulse and the other diode the negative pulse. This configuration has the lower losses. FIG. 6c eliminates one winding and uses a bridge rectification 188' to rectify the output of winding 60.

With the transformer coupling, the total number of primary windings and negative windings are optional and the design can be optimized depending on the requirements and solid state component selection. The key point is that a soft switching converter and design options are available such that series diode and more important solid state switches can be selected to eliminate accurate switch timing requirements and power consuming voltage grating.

Furthermore, series resonant circuit of $C_{res}$ 102 and $L_{res}$ 104 in conjunction with the immediate transition from a charge to a discharge operation will clamp the "rail" voltage of 32 and 34 to either the module input voltage or module output voltage, thereby significantly reducing the switch requirement voltage of a standard resonant converter. This reduces not only the overall switch count, the number of input and output modules $M_p$ and $M_s$, and also increases the efficiency since the total number of switch junctions is reduced.

Figure 7:
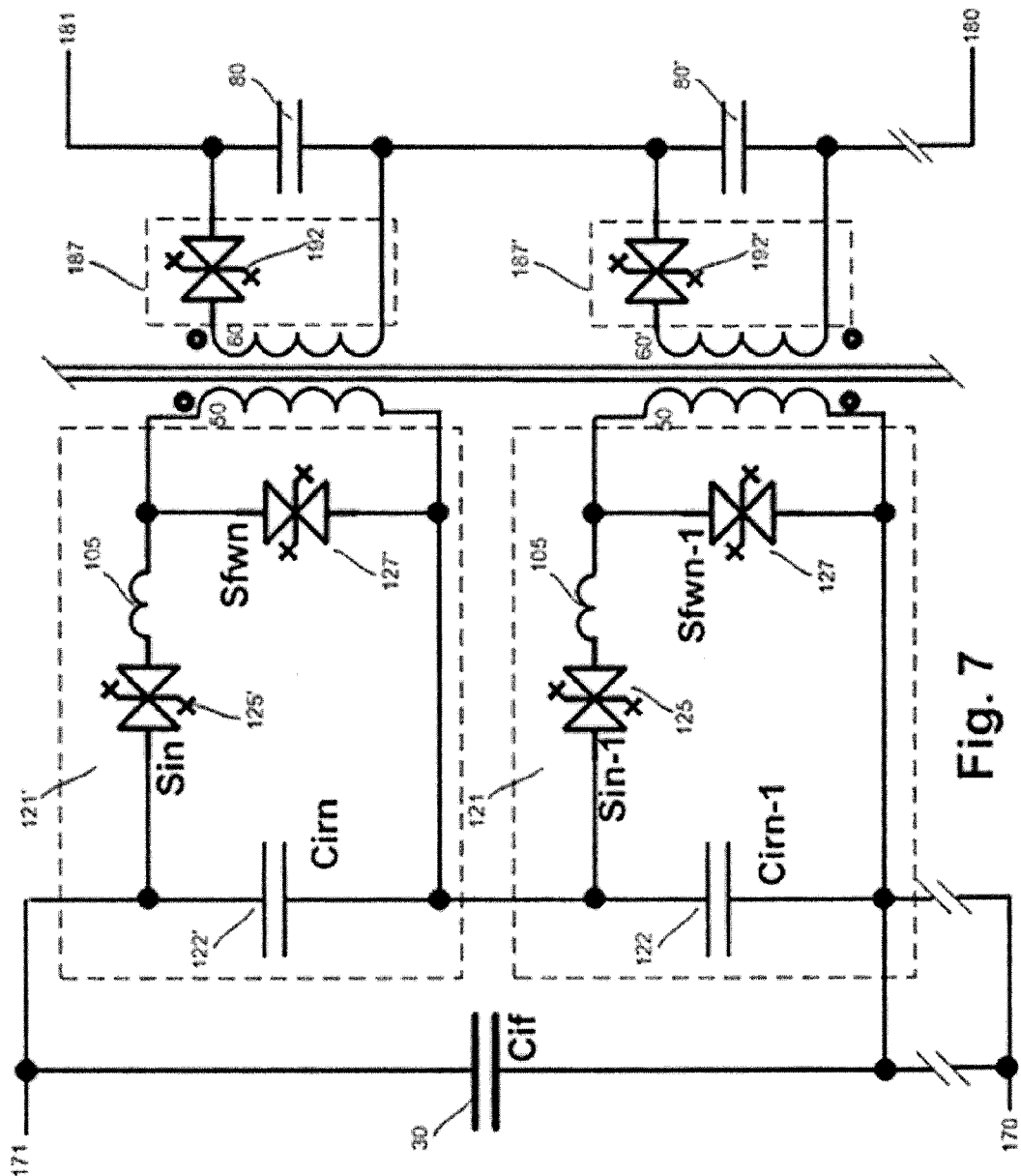
FIG. 7 is an input resonant capacitor inverter for AC-AC, DC-DC and AC-DC configuration.

Referring to FIG. 7, the DC input resonant capacitor converter of FIG. 3 is modified for AC input operation. The input voltage across the right hand terminal 170, 171 is divided between n/2 input filter capacitors $C_{if}$ 30. The capacitor size is selected such that the $C_{if}$ voltage $V_{cif}=2*Vin(\omega t)/n$ when in quasi-steady state. (The $C_{if}$ capacitor is not shown in FIG. 3, but is assumed to be present.) With the use of the input capacitor resonant converter, it follows that the average voltage on the smaller input resonant capacitor $C_{ir}$ is $V_{cir}=V_{in}(\omega t)/n$. The operation is again a push-pull operation with converter modules 121 and 121' alternating, reversing the magnetic flux in the transformer core.

The transformer winding-ratio is selected to operate in buck mode, such that the free-wheeling switches 127 and 127' regulate the throughput power over a specified range.

Again the converter modules can be connected in series such that the switches 125 and 127 can consist of individual AC-Switches without series connection and highly synchronized triggering requirements. The AC switches permit power transfer from either a DC or an AC input. The number of output stages can be similarly selected and is, for most applications, different from the number of input stages as long as the transformer cores provide the magnetic coupling. The transformer is designed for the required primary and secondary turns-ratio, has the required number of primary as well as secondary windings, and is designed with a leakage inductance such that the required resonant period is obtained.

This architecture differs from the previous architecture in that the current on the left input side flows only through the input switch 125 or 125', eliminating the dual charge-discharge operation of the architecture shown in FIG. 6.

Not shown is an AC modification of the series resonant converter. The modification requires again the replacement of some of the unidirectional switches with that of AC-Switches and the addition of the necessary control. In fact a number of single stage converter configurations may be connected in series to implement the general high voltage architecture for DC or AC operation as outlined in FIG. 1.

The module stacking of FIG. 1 shows only one transformer, coupling the right converter side to the left side. However, the architecture may have a number of coupling transformers as long as the primary and secondary windings are repetitive.

7 Open DELTA with Rotating Operation

Figure 8:
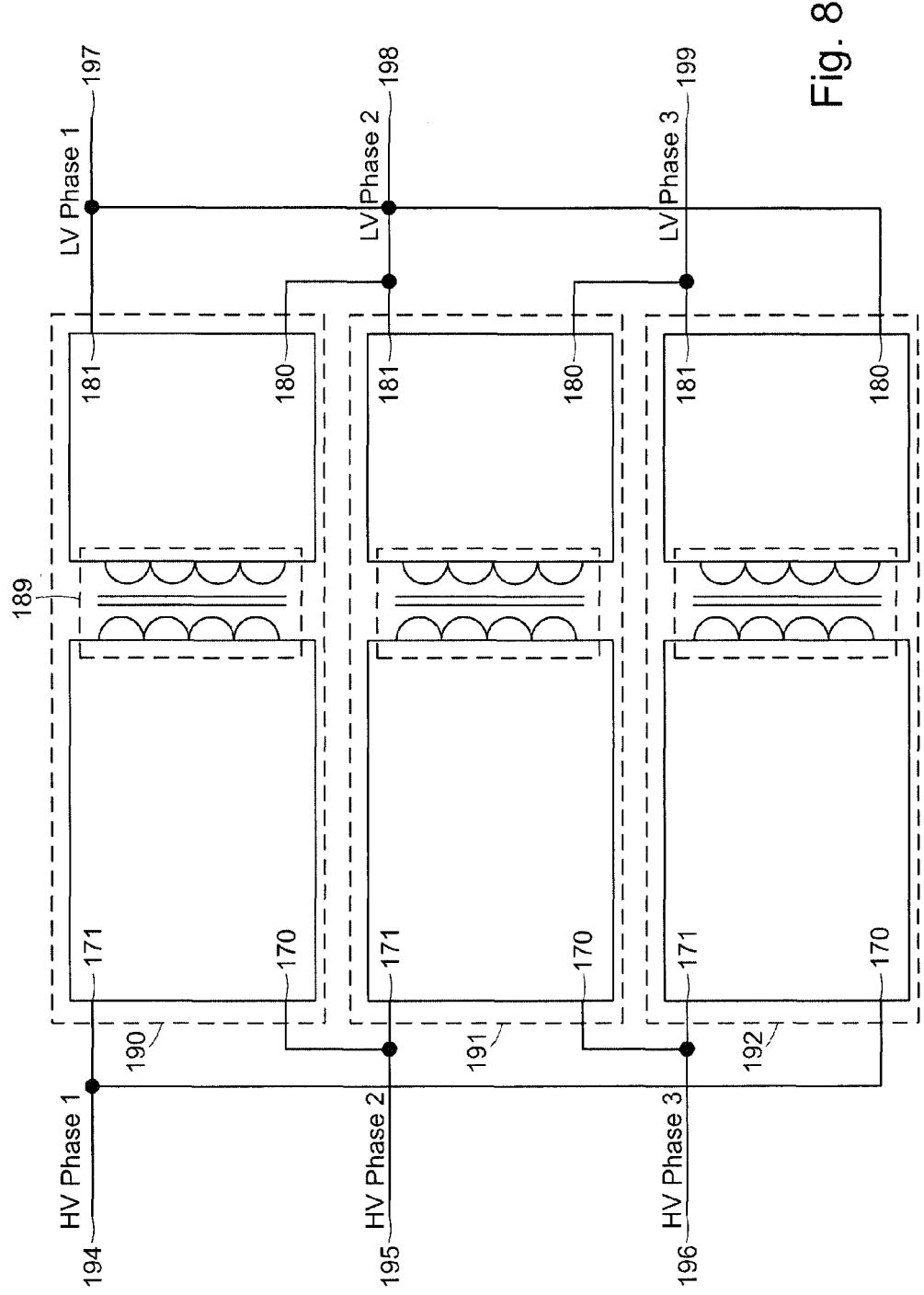
FIG. 8 is a three-phase AC to AC transformation in DELTA configuration.

Using the single phase AC to AC architecture of the previous section as a building block, a number of three-phase transformers can be configured. The transformation may be an AC step-down or step-up using three single phase AC transformers as described previously. Using, for example, the series module configuration, a single phase output can be constructed equivalent to three standard 50 or 60 Hz three-phase transformers, with one single-phase transformer per phase. These three-phase transformers can be configured as a DELTA-Delta, Delta-WHY, WHY-Delta or WHY-Why configuration. Referring to FIG. 8, one such DELTA-DELTA configuration is illustrated.

Single phase DELTA-DELTA configurations are popular for power distribution, since they give the option, should one transformer burn out, the three-phase operation continuous in an "Open DELTA" configuration, with reduced power. The same fallback can be used for the three-phase HVR-Link transformer configuration, since, if one single phase HVR-Link transformer falls out, the regulated throughput power can continue with the remaining two HVR-Link transformers. This is an important contingency.

The second motivation for the "HVR-Link Open DELTA" is to maximize efficiency and flexibility of control by implementing a "Rotating Open DELTA" configuration with the "Open DELTA" transformer configuration changing every 60 electrical degrees. The neutralized transformer is the one that would normally operate below ~25% of its peak power.

FIG. 8 shows a three-phase DELTA-DELTA configuration with each transformer configured with a system such as those illustrated in FIG. 6 or in FIG. 7 with each transformer 190, 191, and 192 connected to two AC phases on the input and two phases on the output of 197, 198, and 199. The input voltage is divided between a number of stacked converters such that no series connected switches are required. Therefore, reliable operation is obtained with the highest voltage available solid state switches without sub-microsecond triggering requirements.

The use of the soft switching converter topology eliminates high turn-on and turn-off switching losses, resulting in a substantial switch loss reduction. The use of the soft switching converter topology also yields an increase of transformer efficiency, permitting a high inverter efficiency with full switch power utilization and reduction of the passive components of the single phase transformer, capacitors, and inductors.

The inverter operation of the resonant inverter of FIG. 6 and the timing operation as described in '718 results in a reduction of the number of switch stages, since the resonant voltage for the switches is reduced by about 40 to 50 percent. Furthermore, the resonant operation reduces the dI/dt and with it the EMI and EMC of the converter, an important feature for a system that can transmit or conduct these disturbances over long distances.

Figure 9:
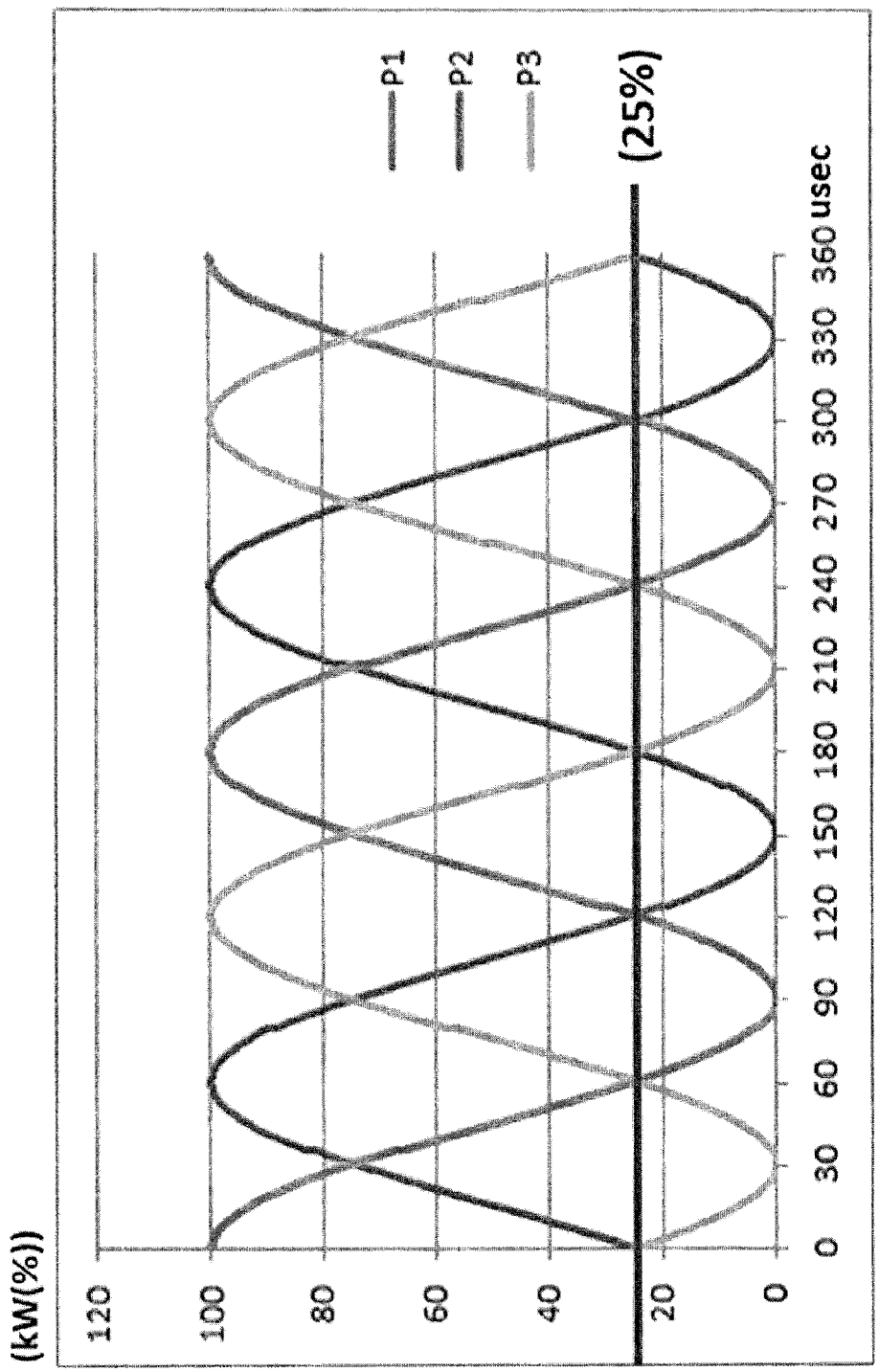
FIG. 9 is a DELTA Transformer power profile.

The normalized power of the three DELTA-DELTA transformer configuration is shown in FIG. 9 over 360 electrical degrees for both 50 Hz, 60 Hz, or other frequencies. The power throughput is cyclic at twice the line frequency. Any of the three transformer legs of 190, 191, or 192 can be idled for either a transformer system failure or for the proposed "Rotating Open DELTA" operation.

Referring to FIG. 9, one transformer system is operated below 25% of typical peak power requirement at any point of the 360 electrical degree cycles. It is convenient to eliminate the low power transformer operation below the 25% line shown in FIG. 9 with the contribution of the two higher power transformer systems. As can be seen, the transformer system with the <25% changes every 60 electrical degrees. For example, at 45 electrical degrees, three transformers 190, 191, and 192 deliver in the DELTA configuration in proportion 93, 50, and 7 power respectively. With the transformer system 192, the remaining two transformer systems make up the small amount of power of the transformer system 192 on the output terminal 199.

The output current for terminal 199 is provided by terminal 180 of transformer system 191 and terminal 181 of transformer system 190.

The input side of each single phase system of 190, 191, and 192 is connected to two of the three HV input phases 194, 195, and 196. Power is drawn out of each of the three input phases by the two active "Rotating Open DELTA" systems. Each module in the transformer system can be controlled to draw only real input power while neutralizing the reactive power through its inversion or reversal switch timing. This gives the three-phase HVR-Link system the additional capability of not only operating as a regulated AC transformer but also as a VAR compensator. Since only real power is drawn, we have positive input power for each of the three module system. This is not necessary if the desired input phase angle is selected to be a value other than unity.

The architecture of FIG. 8 is implied to be a high voltage AC to AC step-down system, however, since the converter type shown in FIG. 6 and FIG. 7 is bi-directional, the same FIG. 8 configuration is also bi-directional and can be used to step up power from a low AC voltage to higher three-phase AC voltage.

There are also several ways to go from three-phase to DC or visa-versa. Each of the right hand sides of FIG. 8 can be rectified and connected to either a common set of DC terminals in parallel or in a series configuration. Since this is not a voltage source converter, the output does not have a 300 or 360 Hz ripple as is the case for a standard rectifier system and the filter requirement is minimum.

In summary the architecture of FIG. 8 is a soft switching architecture and high voltage switches can be used to reduce both the single-phase transformer and passive components. Also the converter architecture introduced in FIG. 6 limits the hold-off switch voltage requirement over other resonant converters, therefore requiring fewer numbers of series connected stages. All of these contributions reduce the number of active and passive components and increase the efficiency such that the HVR-Link transformer becomes competitive with standard AC transformers and other standard applications.

8 HV VAR Compensator

Figure 10:
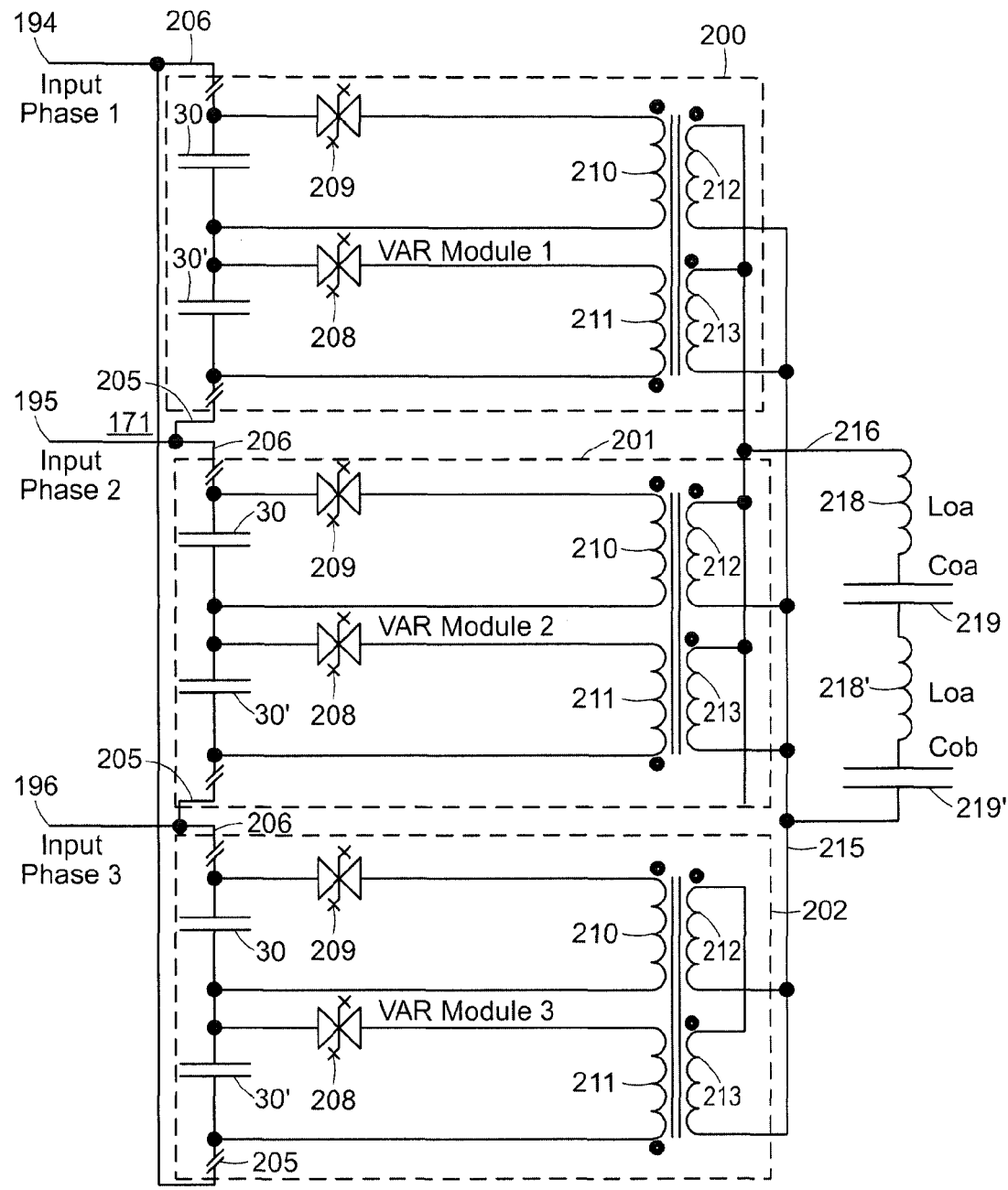
FIG. 10 is a HV VAR Compensator.

Referring to FIG. 10, a fast acting High Voltage Dynamic Compensator is of prime importance for the high voltage grid. Established hard switching voltage source converters are limited by their maximum input voltage and operating frequency. In addition, low frequency line transformers are used to connect such converters to a higher voltage grid The Resonant Link converter permits the direct connection of the R-Link VAR to the grid, however, AC lines carrying above 2 kV require series connected switches. The inventor has developed high voltage switch stacks with a voltage rating of 30 kV, permitting direct R-Link VAR compensators to be directly connected to an 11 kV AC sub-station voltage. However, the switches in such stacks need to be triggered simultaneously within ~0.1 μsec to have sufficient switch voltage sharing. The highly synchronized triggering requirement and the complexity of the series HV stack construction motivated the adoption of the series connected VAR compensator modules, such that no series switch connection or accurate triggering is required.

Figure 12:
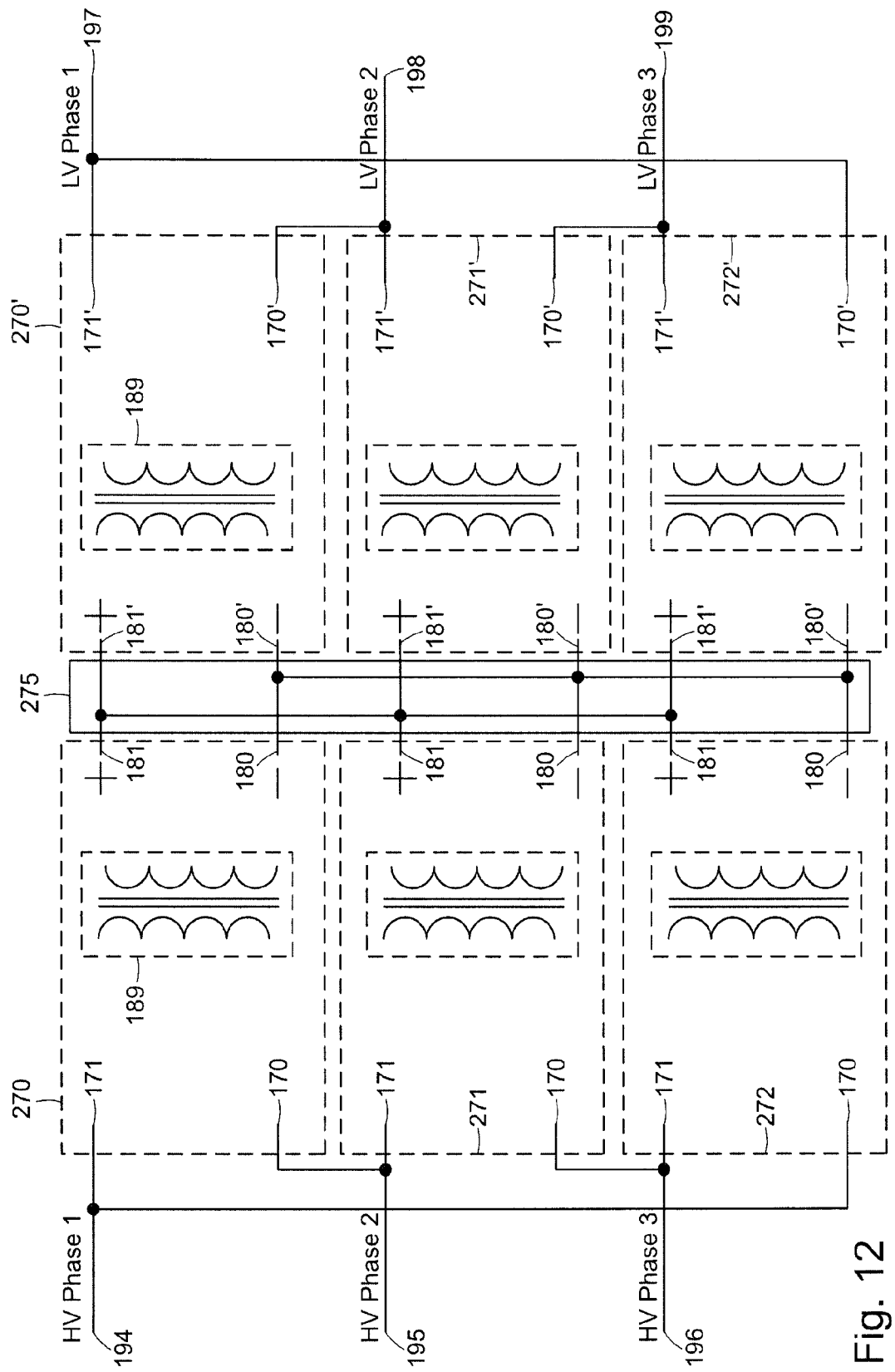
FIG. 12 is a high voltage asynchronous AC to AC transformation.

The HVR-Link VAR compensator operates in a similar manner as the lower voltage configurations used for 480 V AC (e.g., those shown in FIG. 7 of '678 and FIG. 12 of '718). The HVR-Link VAR compensator is shown in FIG. 10 without the low-frequency input cutoff filters.

The HVR-Link VAR inputs 194, 195, and 196 are connected to three VAR module systems 200, 201, and 202. Each VAR module system has two inputs 205, 206. Each module system is connected between two different input phases and makes up a DELTA input configuration. Each module system has a number of series connected modules as shown in FIG. 10 with two bidirectional charging switches 208 and 209. There are no other types of switches in the system. Each module has two primary transformer windings 210, 201, with one of the primary windings having an inverse polarity for core-flux reversal. The secondary windings are connected in parallel onto the upper and lower "rails" 215 and 216. Connected cross the "rails" are a plurality of resonant capacitors $C_o$ 219 and a plurality of resonant inductors $L_o$ 218. These components predominantly determine the resonant frequency. The secondary voltage can be selected by the transformer turn-ratio to optimize and match the passive resonant components.

For the R-Link VAR operation the $C_o$ capacitor voltage is reversed, drawing only a small quantity of net power to compensate for the losses. With no energy exchanged with the input system, only reactive power is forced to flow through the input terminals. The VAR power flow is proportional to the $C_o$ initial and final voltage and the inverter frequency. This requires only two charge interchanges with two of the three VAR module systems similar to the "Rotating Open DELTA". The switch selection changes every 30 electrical degrees.

The three input phases can be classified as "Primary", "Secondary", and "Tertiary" phases. The "primary" phase has the lowest input voltage and the highest VAR current and is connected to both the "Secondary" module system and the "Tertiary" module system.

A "Secondary" switch 208 is triggered, discharging part of the $C_o$ energy into the "Primary" and "Secondary" with the proper current flow direction. Once sufficient charge is exchanged, the "Tertiary" switch is triggered. With the proper switch identification, the "Secondary" switch is back-biased and turns off, while the $C_o$ capacitor is recharged with the opposite polarity. The transformer leakage inductance for this application is used as a commutation inductance to limit the dI/dt of the communication.

The triggering time, "$t_1$" of the "Tertiary" switch yields the correct $C_o$ voltage reversal. Any deviation from this timing will either increase or decrease the reversal voltage and the subsequent VAR current.

Once the resonant current becomes zero, the next "Secondary" switches 209 are triggered. This starts the reversal of the $C_o$ capacitor voltage in the opposite direction using the transformer winding 208. This also reverses the flux in the transformer cores and prevents the cores from saturation. Again, this is a two-step procedure with the current flowing in the input phase in the same direction. With this procedure, no switches are required for the secondary transformer winding, reducing both the switching requirements and the control requirements.

Referring to FIG. 12, a modeling result with two $C_o$ voltage cycles illustrates the current and central capacitor voltage The operation starts with −1200 V 230, reverses to +1200 V 232 after the first reversal $C_o$, and ends up at −1200 V 234. At that point the system is ready for the next complete cycle with a −1200 to 1200 V $C_o$ reversal.

The primary input current I3 246 is negative and is the current in Phase 3 of FIG. 10. For this operation Phase 2 is the "Secondary" phase and Phase 1 the "Tertiary" phase. At t=0 the switch 206 of VAR Module 2 201 is triggered resulting in the input current flow of 246 and 248, starting a reduction of the negative $C_o$ voltage. The charge transfer of the primary charge is the area under the I2 current curve.

At "$t_1$" the switch 209 of VAR Module 1 200 is triggered. This back-biases the active switch in 201 and the charge interchange with $C_o$ continues at a higher dI/dt with the input phase I1 current 250. As the voltage on $C_o$ reaches a maximum positive voltage, the current through the VAR Module 1 switch 209 becomes zero, the charge changes from negative to positive, and the voltage charge reversal completes with a charge transfer of the current as shown by plot line 254. For this phase angle VAR Module 3 202 is utilized.

As soon as the negative to positive $C_o$ charge reversal is completed, the positive to negative $C_o$ operation 256 can be started by triggering switch 208 of 201. This connects the filter capacitor 30' to the reverse primary winding 211. With the reverse winding arrangement the input current in I3 and I2 flows in the same direction while the current through $C_o$ is reversed, yielding the voltage labeled as element 262.

The switch 208 of VAR Module 1 200 is then triggered. This turns off the switch 208 of VAR module 2 201 and the input current of phase 2. The energy flow from phase 1 and phase 3 continues to recharge the $C_o$ capacitor to the negative polarity. This recharge is complete at 260 and the reverse operation can be reinitiated with change of the "$t_1$" timing.

The charge transfer from the secondary phase 252 and the charge transfer shown as plot line 254 are proportional to the VAR current and are proportional to the $C_o$ voltage. Increasing the value of "$t_1$" will reduce the recharge time and with it the $C_o$ voltage and the input VAR current for subsequent operation. For low VAR current, the VAR current can be reduced by operating at a lower converter frequency.

The VAR current can be reversed from one charge exchange to the next to transfer from a full leading to a full lagging VAR current, therefore, yielding a high converter bandwidth. However, the limiting factor is defined by the low-pass input filter not shown in FIG. 10. The timing shown corresponds to an inverter frequency of 4 kHz. From practical consideration the typical band width is about ½0 of the converter frequency or 200 Hz for the operation shown. This is well above the flicker frequency of 30 Hz or 6 Hz for active sub-harmonic grid oscillation control.

Figure 11:
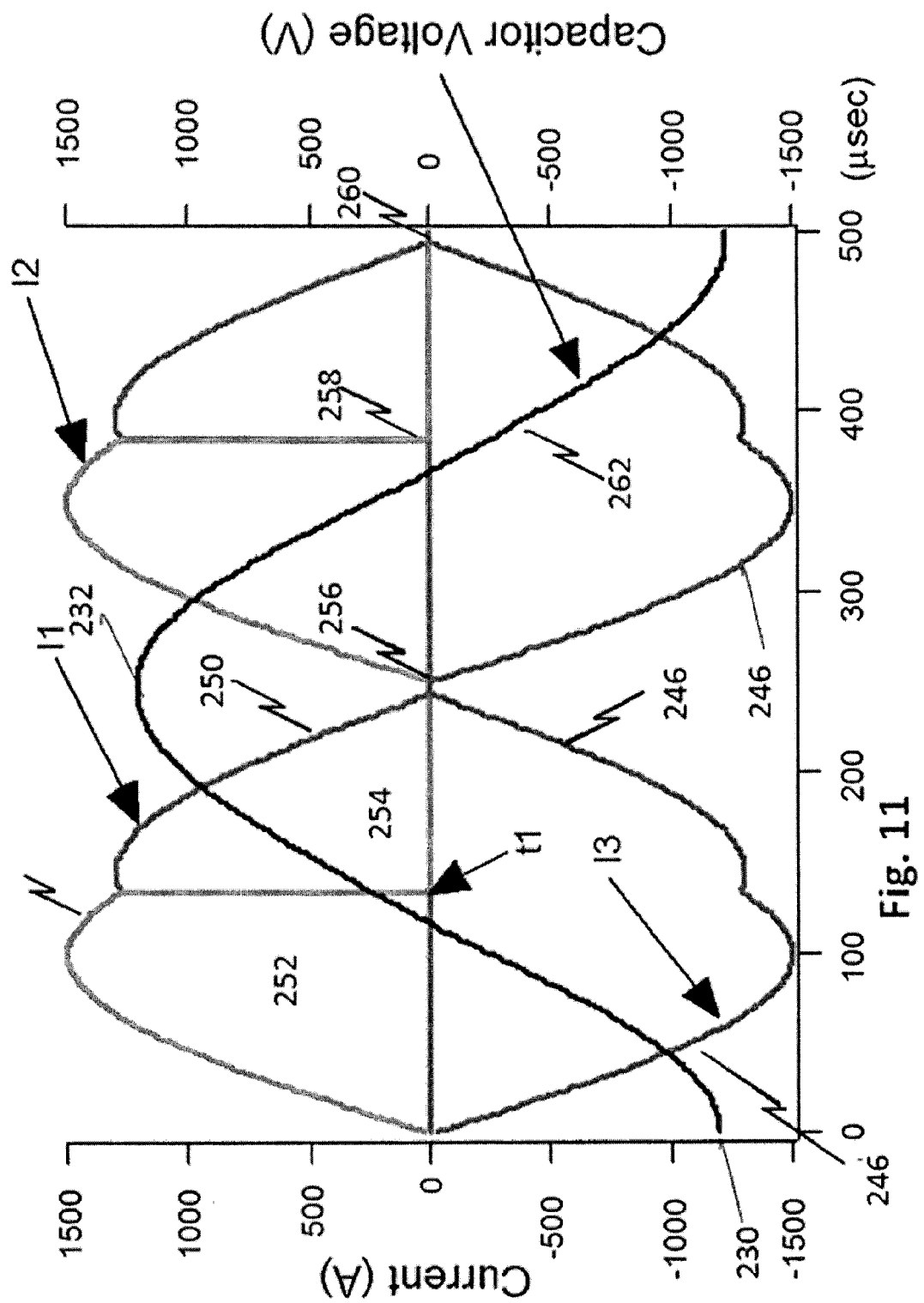
FIG. 11 is a HV VAR Compensator Operation.

FIG. 11 shows at "$t_1$" an instantaneous turn-off of I2 and turn-on of I1. This is not desirable, since it yields a high dI/dt and with it high switching losses. In practice, the transformer is designed with a specified leakage inductance that serves as a commutation inductance, limiting the dI/dt to a desirable value. This commutation inductance also makes the timing less critical as the transition from one voltage reversal to the next occurs, since it provides some inductive isolation.

An important feature for the R-Link VAR compensator is that the VAR current can be maintained at full level practically down to about 2% of the line voltage. This is an important feature since VAR support is most critical as the line voltage drops. Only sufficient line voltage is required to make up for the losses. Most VAR compensators, including a simple VAR capacitor bank, lose their effectiveness with a reduction of the AC line voltage.

In summary, a VAR high frequency, high bandwidth, high voltage, soft switching VAR compensator can be constructed that does not require series connected, highly synchronized high voltage switches. Such a system can be directly connected to the grid, without standard low frequency transformer isolation. Such equipment may be the first high voltage equipment that will be accepted by utility companies since it is not directly in series connected with the power source and the load. If part of it becomes defective, it can be idled with no down time of the load.

The VAR utilization for a high voltage power system will most likely be installed at 11 kV or 13.8 kV sub-station and remotely controlled depending on voltage, VAR, flicker, and sub-harmonic damping control requirements. Since the current flows only through one set of switches per phase, with no switching losses, the efficiency will be high; a critical requirement for utility applications. Should a switch become defective, the system architecture, with conservative voltage operating selection per switch, will prevent a complete system meltdown. A single switch failure will be instantaneously detected and the operation stopped. With sufficient number of input stages in place, one has the option of isolating the failed module such that operation can be continued until maintenance or switch replacement can be scheduled.

9 Multiple Module Operation

In some examples, several of the modules described above can be operated in parallel. To minimize the ripple, only one filter is required with the modules operating in a time interleaved fashion. This increases the effective ripple frequency seen by the input filters, making the filters more effective, but reduces the depth of current modulation. It follows that this type of VAR compensator can be scaled to any power level.

Such a multi-module operation has the advantage that, should one of the components become defective such as the capacitor or a thyristor, its module can be idled while the remaining modules continue to operate, yielding a graceful degradation. Furthermore, this type of VAR compensator is most efficiently operated with a higher VAR level range. Therefore, it is prudent to operate with a lower and lower VAR number of module as the VAR requirement is reduced. The operating VAR modules operate a high VAR levels. The VAR modules are interleaved and timed correctly to yield an equally spaced operation.

10 Asynchronous AC to AC Transformation

The open three-phase to three-phase "delta" operation is best for synchronized three-phase AC transformation using energy flow per phase control. For three-phase asynchronous operation, power or energy has to be shared between the three phases. For the '678 topology the central resonant capacitor receives the energy per pulse from all three inputs and reconstructs each output phase with the correct current proportion. This energy sharing permits asynchronous operation and makes the output phasing completely independent from the input phasing. The same can be accomplished with the input rectified with the power going into a common DC bus followed by a DC-AC reconstruction. One such approach is shown in FIG. 12.

Using a stacked architecture as described in relation to FIG. 10, with a three-phase AC input transformed to a DC output, the rectified DC power appears across the output terminals 180 and 180. The filter capacitors 80 form a DC bus with a bus voltage can be regulated to any practical value. This DC output of all three rectified output modules can be transmitted in DC over long distances for DC transmission or as shown in FIG. 12 connected to the input DC terminals 180' and 181'. The architecture of the three-phase secondary DC to AC modules 270', 271', 272' operates in the inverse mode of the AC to DC input modules 270, 271, and 272 and is shown with full transformer isolation This approach isolates all input phases, output phases, and the DC bus from each other.

Using a module configuration, as shown in FIG. 6a, with AC stages 197 and 197', the power flow is bi-directional, with two stages of regulation between the AC input and AC output. The power drawn can have a unity power factor or a component of VAR support for the input grid, while for the output the power is delivered at the specified line voltage and VAR requirement.

The filtering capacitor on the output of the high voltage AC to DC modules 270, 271, 272 and the input filter capacitor of the lower voltage DC to AC modules 270', 271', and 272' form a common DC bus, permitting the reconstruction of the multi-phase AC output with a different phase and frequency than the AC input on the left. With the proposed converters operating either in buck mode or boost mode, the system can be configured to operate bi-directionally. Furthermore, the three single phase architecture permits both rotating open DELTA operation on both the AC input side and/or AC output side.

Looking further into the detailed operation of the overall system, with the modules configured as described above, all switch operations can be configured with no switches directly connected in series, making accurate high voltage switch triggering synchronization for three-phase AC to asynchronous three-phase AC transformation unnecessary.

It is noted that only a limited number of configurations for the proposed HVR-LinkTH topology are illustrated above. The modularized series connected resonant module converter configuration can be adopted for a large number of converter systems. In addition, the concept can be further combined with some low voltage "hard switched" sections. This further increases the potential applicable topologies.

It is to be understood that the foregoing description is intended to illustrate and not to limit the scope of the invention, which is defined by the scope of the appended claims. Other embodiments are within the scope of the following claims.

What is claimed is:

1. A charge transfer apparatus for transferring an electric charge between an input power terminal and a galvanically isolated output power terminal comprising:
   a transformer including a plurality of primary windings and a plurality of galvanically isolated secondary windings;
   a first plurality of resonant converters having input terminals connected in series to the input power terminal and having output terminals connected to different primary windings of the plurality of primary windings;
   a second plurality of resonant converters having input terminals connected to different secondary windings of the plurality of secondary windings and having output terminals connected to the galvanically isolated output power terminal;
   a control system for controlling the transfer of electric charge between the input power terminal and the galvanically isolated output power terminal including controlling a first plurality of switches of the first plurality of resonant converters and a second plurality of switches of the second plurality of resonant converters in a zero current soft switching mode.

2. The apparatus of claim 1 wherein the input terminal is configured to receive voltages in the range of 600 V to 1000 kV.

3. The apparatus of claim 1 wherein the control system controls the first and second plurality of switches according to a predefined switching sequence.

4. The apparatus of claim 1 wherein the transformer is a high frequency transformer operable at frequencies up to 50 kHz.

5. The apparatus of claim 1 further comprising a plurality of transformers, each including a plurality of primary windings and a plurality of galvanically isolated secondary windings.

6. The apparatus of claim 1 further configured for transferring charge bidirectionally between the input terminal and the galvanically isolated output power terminal.

7. The apparatus of claim 1 wherein the output terminals of the second plurality of resonant converters are connected in series to the galvanically isolated output power terminal.

8. The apparatus of claim 1 wherein the input power terminal is a DC power terminal and the galvanically isolated output power terminal is a DC power terminal.

9. The apparatus of claim 1 wherein the input power terminal is a DC power terminal and the galvanically isolated output power terminal is an AC power terminal.

10. The apparatus of claim 1 wherein the input power terminal is an AC power terminal and the galvanically isolated output power terminal is a DC power terminal.

11. The apparatus of claim 1 wherein the input power terminal is an AC power terminal and the galvanically isolated output power terminal is an AC power terminal.

12. The charge transfer apparatus of claim 1 wherein the first plurality of resonant converters are connected in a cascaded configuration.

13. An n phase charge transfer apparatus including:
   n charge transfer apparatuses connected to an AC grid, each charge transfer apparatus of the n charge transfer apparatuses including:
      a transformer including a plurality of primary windings and a plurality of galvanically isolated secondary windings;
      a first plurality of resonant converters having input terminals connected in series to an input power terminal and having output terminals connected to different primary windings of the plurality of primary windings;
      a second plurality of resonant converters having input terminals connected to different secondary windings of the plurality of secondary windings and having output terminals connected to a galvanically isolated output power terminal;
      a control system for controlling the transfer of electric charge between the input power terminal and the galvanically isolated output power terminal including controlling a first plurality of switches of the first plurality of resonant converters and a second plurality of switches of the second plurality of resonant converters in a zero current soft switching mode;
   wherein a smallest difference in phase angle of operation between the n charge transfer apparatuses is 360 degrees/n and the control systems of each of the n charge transfer apparatuses are configured to coordinate the n charge transfer apparatuses to operate as an n phase charge transfer apparatus.

14. The n phase charge transfer apparatus of claim 13 wherein n equals three, the three phase charge transfer apparatus is connected to the AC grid in a parallel DELTA configuration, and the control systems of the three charge transfer apparatuses are configured to operate the three charge transfer apparatuses as a three phase AC to AC transformer.

15. The n phase charge transfer apparatus of claim 13 wherein n equals 3 and the n phase charge transfer apparatus is connected to the AC grid in a rotating open DELTA configuration.

16. The n phase charge transfer apparatus of claim 13 wherein the input terminals of each of the first and second pluralities of resonant converters are AC terminals and the galvanically isolated output power terminals of each of the first and second pluralities of resonant converters are DC terminals.

17. The n phase charge transfer apparatus of claim 13 wherein the input terminals of each of the first and second pluralities of resonant converters are DC terminals and the galvanically isolated output power terminals of each of the first and second pluralities of resonant converters are AC terminals.

18. The n phase charge transfer apparatus of claim 13 wherein the control system is configured to operate the system as a VAR compensator.

19. The n phase charge transfer apparatus of claim 13 wherein the first plurality of resonant converters are connected in a cascaded configuration.

* * * * *